US012705706B2

(12) United States Patent
Tsuchiya et al.

(10) Patent No.: US 12,705,706 B2
(45) Date of Patent: Aug. 11, 2026

(54) OPTICAL IMAGE PROCESSING METHOD, MACHINE LEARNING METHOD, TRAINED MODEL, MACHINE LEARNING PREPROCESSING METHOD, OPTICAL IMAGE PROCESSING MODULE, OPTICAL IMAGE PROCESSING PROGRAM, AND OPTICAL IMAGE PROCESSING SYSTEM

(71) Applicant: HAMAMATSU PHOTONICS K.K., Hamamatsu (JP)

(72) Inventors: Satoshi Tsuchiya, Hamamatsu (JP); Tatsuya Onishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 273 days.

(21) Appl. No.: 18/290,219

(22) PCT Filed: Mar. 18, 2022

(86) PCT No.: PCT/JP2022/012685
§ 371 (c)(1),
(2) Date: Nov. 10, 2023

(87) PCT Pub. No.: WO2023/276326
PCT Pub. Date: Jan. 5, 2023

(65) Prior Publication Data

US 2024/0257317 A1 Aug. 1, 2024

(30) Foreign Application Priority Data

Jun. 29, 2021 (JP) ................................ 2021-107917

(51) Int. Cl.

| | |
|---|---|
| ***G06T 5/70*** | (2024.01) |
| ***G06T 5/60*** | (2024.01) |
| ***G06T 7/00*** | (2017.01) |

(52) U.S. Cl.
CPC .................. *G06T 5/70* (2024.01); *G06T 5/60* (2024.01); *G06T 7/0004* (2013.01);
(Continued)

(58) Field of Classification Search
CPC .......... G06T 5/70; G06T 5/60; G06T 7/0004; G06T 2207/10056; G06T 2207/20081;
(Continued)

(56) References Cited

U.S. PATENT DOCUMENTS

2016/0084929 A1* 3/2016 Dale ...................... A61B 5/055
324/309
2017/0038314 A1* 2/2017 Suyama .............. G01T 1/20184
(Continued)

FOREIGN PATENT DOCUMENTS

CN 104350735 A 2/2015
CN 110458778 A 11/2019
(Continued)

OTHER PUBLICATIONS

International Preliminary Report on Patentability mailed Jan. 11, 2024 for PCT/JP2022/012685.
(Continued)

*Primary Examiner* — Jennifer Mehmood
*Assistant Examiner* — Vaisali Rao Koppolu
(74) *Attorney, Agent, or Firm* — Faegre Drinker Biddle & Reath LLP

(57) ABSTRACT

An optical image processing module includes an image acquisition unit that acquires an optical image obtained by capturing an image of light from a target object, a noise map generation unit that derives a standard deviation of noise values from a pixel value of each pixel in the optical image on the basis of relationship data indicating a relationship between the pixel value and the standard deviation of noise values obtained by evaluating spread of the noise value and
(Continued)

generates a noise map that is data in which the derived standard deviation of noise values is associated with each pixel in the optical image, and a processing unit that inputs the optical image and the noise map to a trained model built in advance through machine learning and executes image processing of removing noise from the optical image.

16 Claims, 15 Drawing Sheets

(52) U.S. Cl.
CPC ............... *G06T 2207/10056* (2013.01); *G06T 2207/20081* (2013.01); *G06T 2207/30164* (2013.01); *G06T 2207/30168* (2013.01)

(58) Field of Classification Search
CPC . G06T 2207/30164; G06T 2207/30168; G06T 2207/20076; G06T 2207/20084
See application file for complete search history.

(56) References Cited

U.S. PATENT DOCUMENTS

2019/0378270 A1* 12/2019 Ida ..................... G01R 33/5608
2020/0285901 A1* 9/2020 Hiasa ..................... H04N 25/63
2021/0104021 A1* 4/2021 Sohn ...................... G06N 3/045
2021/0104313 A1* 4/2021 Mizobe ................ G06N 3/0475
2021/0152735 A1 5/2021 Zhou et al.

FOREIGN PATENT DOCUMENTS

CN 111260579 A 6/2020
JP 2019-208990 A 12/2019
JP 2020-021314 A 2/2020
JP 2020-144488 A 9/2020

OTHER PUBLICATIONS

Extended European Search Report issued on Mar. 27, 2025 in corresponding European patent application 22832489.3.
Wu et al., “Image Denoising by Combining Deep Residual Learning and Perceptual Loss”, Journal of Image and Graphics, vol. 23, Oct. 16, 2018, p. 55-p. 63.

* cited by examiner 1
2
CAMERA
22
IMAGE CONTROL UNIT
21
PHOTODETECTOR
24
IMAGING OPTICAL SYSTEM
23
OBJECTIVE LENS
L
F
3
OPTICAL IMAGE PROCESSING MODULE
31
INPUT UNIT
32
IMAGE ACQUISITION UNIT
33
NOISE MAP GENERATION UNIT
34
PROCESSING UNIT
35
BUILDING UNIT
36
TRAINED MODEL
4
DISPLAY DEVICE
5
INPUT DEVICE Gc
STRUCTURE IMAGE
Gt
TRAINING IMAGE
36
TRAINED MODEL
G1
CONDITION INFORMATION
21(2)
G5
G3
STANDARD DEVIATION OF NOISE VALUES
PIXEL VALUE
G6

1A
2
CAMERA
22
IMAGE CONTROL UNIT
21
PHOTODETECTOR
24
IMAGING OPTICAL SYSTEM
23
OBJECTIVE LENS
L
F
3A
OPTICAL IMAGE PROCESSING MODULE
32A
IMAGE ACQUISITION UNIT
33A
NOISE MAP GENERATION UNIT
34
PROCESSING UNIT
35
BUILDING UNIT
36
TRAINED MODEL
4
DISPLAY DEVICE
5
INPUT DEVICE

Gc
STRUCTURE IMAGE
Gt
TRAINING IMAGE
36
TRAINED MODEL
G26
JIG IMAGE
G1
G5
G6
G28
SNR
LUMINANCE VALUE

G26
G1
G1
0
PIXEL POSITION
G2
STANDARD DEVIATION OF NOISE VALUES
PIXEL POSITION
G27
STANDARD DEVIATION OF NOISE VALUES
PIXEL VALUE
G5
G5
0
PIXEL POSITION
G4
STANDARD DEVIATION OF NOISE VALUES
PIXEL POSITION

OPTICAL IMAGE PROCESSING MODULE
INPUT UNIT
IMAGE ACQUISITION UNIT
NOISE MAP GENERATION UNIT
PROCESSING UNIT
BUILDING UNIT
TRAINED MODEL
INPUT DEVICE
DISPLAY DEVICE
1
2B
3
4
5
6
7
31
32
33
34
35
36
61
62
63
64
65
66
71
72
651
652
653
654
655
656
P1
F

OPTICAL IMAGE PROCESSING METHOD, MACHINE LEARNING METHOD, TRAINED MODEL, MACHINE LEARNING PREPROCESSING METHOD, OPTICAL IMAGE PROCESSING MODULE, OPTICAL IMAGE PROCESSING PROGRAM, AND OPTICAL IMAGE PROCESSING SYSTEM

TECHNICAL FIELD

The present disclosure relates to an optical image processing method, a machine learning method, a trained model, a machine learning preprocessing method, an optical image processing module, an optical image processing program, and an optical image processing system.

BACKGROUND ART

Since the past, a technique of capturing an image of light from a sample that is an imaging target, acquiring image data based on the imaging result, and outputting noise-removed image data by removing noise from the image data has been known (see, for example, Patent Literature 1).

CITATION LIST

Patent Literature

[Patent Literature 1] Japanese Unexamined Patent Publication No. 2020-21314

SUMMARY OF INVENTION

Technical Problem

In a noise removal process as described above, a method of removing noise from an optical image obtained by capturing an image of light from a target object such as a sample using a trained model based on machine learning may be used. In that case, since the pattern of noise changes depending on conditions such as the type of photodetector used for image capturing, noise may not be effectively removed depending on the conditions and the trained model.

The present disclosure was contrived in view of such a problem, and an object thereof is to provide an optical image processing method, a machine learning method, a trained model, a machine learning preprocessing method, an optical image processing module, an optical image processing program, and an optical image processing system that make it possible to effectively remove noise in an optical image.

Solution to Problem

According to an aspect of an embodiment, there is provided an optical image processing method including: an image acquisition step of acquiring an optical image obtained by capturing an image of light from a target object; a noise map generation step of deriving an evaluation value obtained by evaluating spread of a noise value from a pixel value of each pixel in the optical image on the basis of relationship data indicating a relationship between the pixel value and the evaluation value and generating a noise map that is data in which the derived evaluation value is associated with each pixel in the optical image; and a processing step of inputting the optical image and the noise map to a trained model built in advance through machine learning and executing image processing of removing noise from the optical image.

Alternatively, according to another aspect of an embodiment, there is provided an optical image processing module including: an image acquisition unit configured to acquire an optical image obtained by capturing an image of light from a target object; a noise map generation unit configured to derive an evaluation value obtained by evaluating spread of a noise value from a pixel value of each pixel in the optical image on the basis of relationship data indicating a relationship between the pixel value and the evaluation value and generate a noise map that is data in which the derived evaluation value is associated with each pixel in the optical image; and a processing unit configured to input the optical image and the noise map to a trained model built in advance through machine learning and execute image processing of removing noise from the optical image.

Alternatively, according to another aspect of an embodiment, there is provided an optical image processing program causing a processor to function as: an image acquisition unit configured to acquire an optical image obtained by capturing an image of light from a target object; a noise map generation unit configured to derive an evaluation value obtained by evaluating spread of a noise value from a pixel value of each pixel in the optical image on the basis of relationship data indicating a relationship between the pixel value and the evaluation value and generate a noise map that is data in which the derived evaluation value is associated with each pixel in the optical image; and a processing unit configured to input the optical image and the noise map to a trained model built in advance through machine learning and execute image processing of removing noise from the optical image.

Alternatively, according to another aspect of an embodiment, there is provided an optical image processing system including: the optical image processing module; and an imaging device configured to acquire the optical image by capturing an image of light from the target object.

According to any of the above aspect or another aspect, the evaluation value is derived from the pixel value of each image in the optical image on the basis of the relationship data indicating the relationship between the pixel value and the evaluation value obtained by evaluating the spread of the noise value, and the noise map that is data in which the derived evaluation value is associated with each pixel in the optical image is generated. The optical image and the noise map are then input to the trained model built in advance through machine learning, and image processing of removing noise from the optical image is executed. According to such a configuration, noise in each pixel in the optical image is removed through machine learning in consideration of the spread of the noise value evaluated from the pixel value of each pixel in the optical image. This makes it possible to realize noise removal corresponding to the relationship between the pixel value and the spread of noise in the optical image using the trained model. As a result, it is possible to effectively remove noise in the optical image.

According to another aspect of an embodiment, there is provided a machine learning method including a building step of using a structure image to which noise is added based on a predetermined noise distribution model as a training image and using the training image, a noise map generated from the training image on the basis of relationship data indicating a relationship between a pixel value and an evaluation value obtained by evaluating spread of a noise value, and noise-removed image data which is data obtained by removing noise from the training image, as training data, to build a trained model that outputs the noise-removed image data on the basis of the training image and the noise map through machine learning. The optical image processing module may include a building unit configured to use a structure image to which noise is added based on a predetermined noise distribution model as training image and use the training image, the noise map generated from the training image on the basis of the relationship data, and noise-removed image data which is data obtained by removing noise from the training image, as training data, to build a trained model that outputs the noise-removed image data on the basis of the training image and the noise map through machine learning. According to the above configuration, a trained model that realizes noise removal corresponding to the relationship between the pixel value and the spread of noise can be built using an optical image which is a training image, a noise map generated from the image, and the noise-removed image data. As a result, noise in the optical image of the target object can be more effectively removed using the trained model.

According to another aspect of an embodiment, there is provided a trained model built using the machine learning method, the trained model causing a processor to execute image processing of removing noise from an optical image of a target object. This makes it possible to realize noise removal corresponding to the relationship between the pixel value and the spread of noise in the optical image using the trained model. As a result, it is possible to effectively remove noise in the optical image.

Further, according to another aspect described above, there is provided a machine learning preprocessing method in the machine learning method, including: a training image generation step of generating the structure image to which noise is added based on the noise distribution model as the training image; and a noise map generation step of deriving the evaluation value from a pixel value of each pixel in the structure image on the basis of the relationship data and generating a noise map that is data in which the derived evaluation value is associated with each pixel in the structure image. According to such a configuration, the noise map which is training data for the machine learning method corresponds to the relationship between the pixel value and the evaluation value obtained by evaluating the spread of the noise value. Thereby, when the optical image and the noise map generated from the optical image are input to the trained model built using the training image and the noise map generated through the above preprocessing method, it is possible to realize noise removal corresponding to the relationship between the pixel value and the spread of noise. As a result, it is possible to more effectively remove noise in the optical image of the target object.

Advantageous Effects of Invention

According to an aspect and another aspect of the present embodiment, it is possible to provide an optical image processing method, a machine learning method, a trained model, a machine learning preprocessing method, an optical image processing module, an optical image processing program, and an optical image processing system that make it possible to effectively remove noise in an optical image.

DESCRIPTION OF EMBODIMENTS

Figure 1:
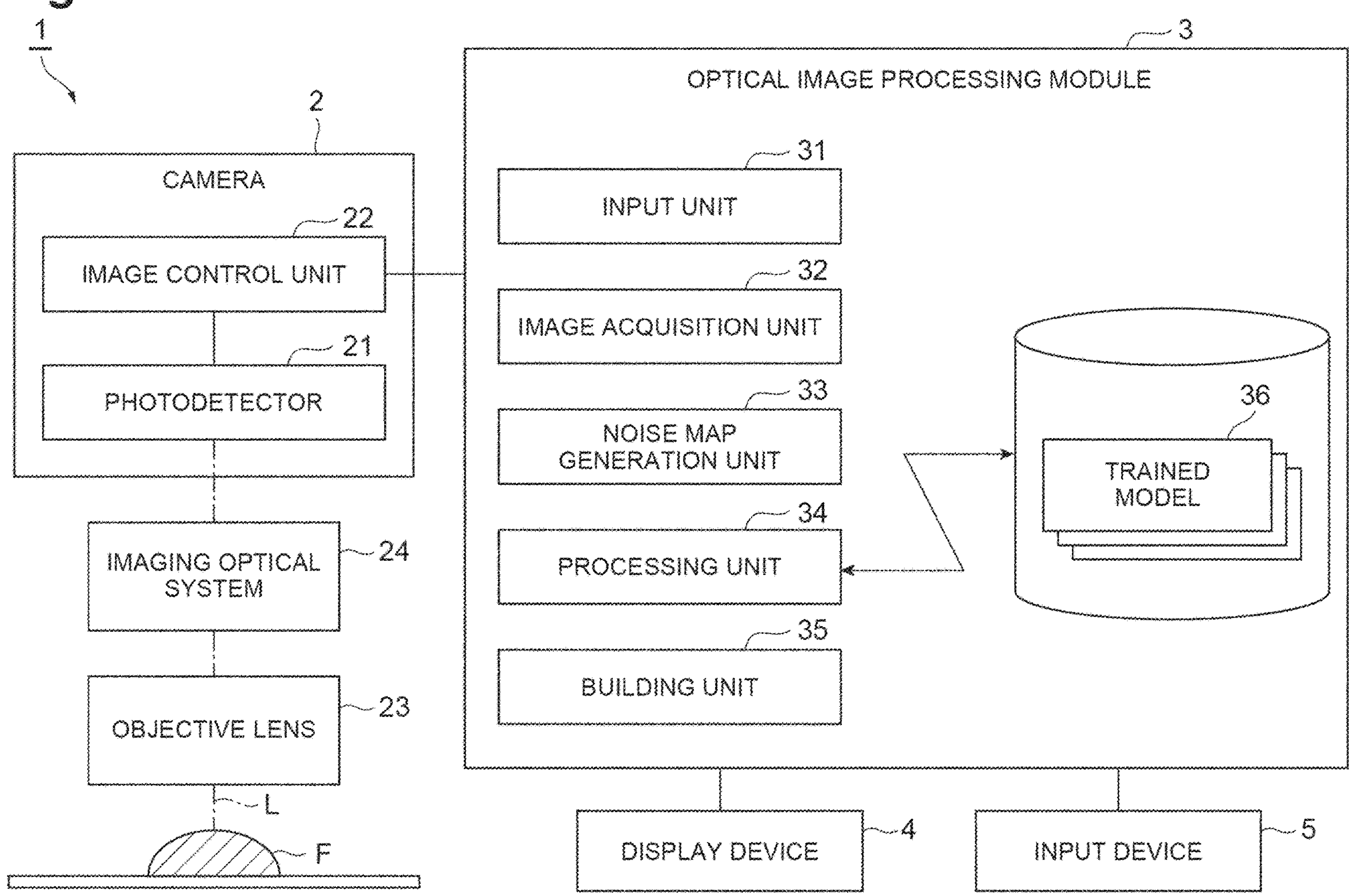
FIG. 1 is a block diagram illustrating a functional configuration of an optical image processing system according to a first embodiment.

Hereinafter, an embodiment of the present disclosure will be described in detail with reference to the accompanying drawings. Meanwhile, the same or equivalent portions in the drawings are denoted by the same reference numerals and signs, and thus description thereof will not be repeated.

First Embodiment

FIG. 1 is a block diagram illustrating a functional configuration of an optical image processing system 1 according to a first embodiment. As shown in FIG. 1, the optical image processing system 1 is a system that acquires an optical image obtained by capturing an image of a target object F on the basis of light L from the target object F. Examples of the light L include light emitted from the target object F, transmitted light from the target object F, reflected light from the target object F, and scattered light from the target object F. Examples of the light L include ultraviolet rays, visible rays, and infrared rays. Hereinafter, the above light may be referred to as observation light. The optical image processing system 1 includes a camera (imaging device) 2, an optical image processing module 3, a display device 4, and an input device 5.

The camera 2 acquires an optical image by capturing an image of the light L from the target object F. The camera 2 includes a photodetector 21 and an image control unit 22. The photodetector 21 is an imaging element having a plurality of pixels. Examples of the photodetector 21 include a charge coupled device (CCD) image sensor, a complementary metal-oxide semiconductor (CMOS) image sensor, a photodiode, an InGaAs sensor, a time delay integration (TDI)-CCD image sensor, a TDI-CMOS image sensor, an imaging tube, an electron multiplying (EM)-CCD image sensor, an electron bombarded (EB)-CMOS image sensor, a single photon avalanche diode (SPAD, single-pixel photon counter (SPPC)), a multi-pixel photon counter (MPPC), silicon photomultiplier (SiPM), a hybrid photo detector (HPD), an avalanche photodiode (APD), and a photomultiplier tube (PMT). In addition, the photodetector 21 may be a CCD image sensor, a CMOS image sensor, or the like combined with an image intensifier (I.I) or a micro-channel plate (MCP). Examples of the shapes of the photodetector 21 include an area sensor, a line sensor that acquires an image through line scanning, a TDI sensor, and a point sensor that acquires an image through two-dimensional scanning. The camera 2 captures an image of the light L from the target object F formed by an imaging optical system 24 through an objective lens 23, and outputs a digital signal based on the imaging result to the image control unit 22.

The image control unit 22 executes image processing based on a digital signal from the photodetector 21. The image control unit 22 is constituted by, for example, a central processing unit (CPU), a graphics processing unit (GPU), a field-programmable gate array (FPGA), or the like. The image control unit 22 generates image data on the basis of the digital signal received from the photodetector 21, applies predetermined image processing to the generated image data, and then outputs the data to the optical image processing module 3.

The optical image processing module 3 is a computer such as, for example, a personal computer (PC). The optical image processing module 3 performs image processing on the image data output from the camera 2 to generate an optical image from which noise has been removed. The optical image processing module 3 is connected to each of the camera 2, the display device 4, and the input device 5 in a wired or wireless manner so as to communicate with each other. The generated optical image is output to the display device 4 after noise removal processing to be described later is performed, and is displayed by the display device 4. Various types of input information such as imaging conditions of the target object F are input to the optical image processing module 3 from the input device 5 on the basis of a user's operation. In addition, the optical image processing module 3 controls the camera 2. Meanwhile, although the optical image processing module 3 of the first embodiment is a device provided independently outside the camera 2, it may be integrated inside the camera 2. For example, the optical image processing module 3 may be a module equivalent to a processing circuit mounted in a camera such as a CPU and a GPU.

Figure 2:
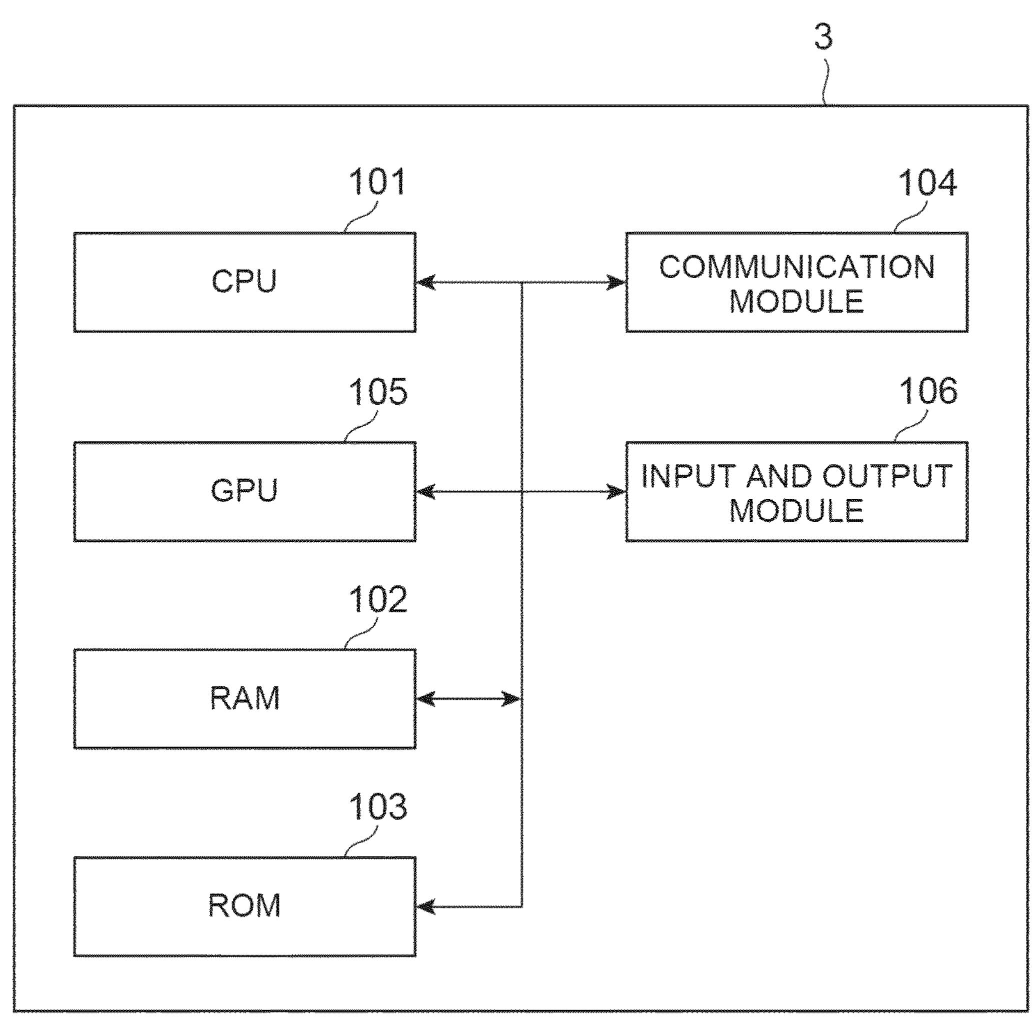
FIG. 2 is a diagram illustrating a hardware configuration of an optical image processing module in FIG. 1.

FIG. 2 shows a hardware configuration of the optical image processing module 3. As shown in FIG. 2, the optical image processing module 3 is a computer or the like physically including a central processing unit (CPU) 101 and a graphics processing unit (GPU) 105 which are processors, a random access memory (RAM) 102 and a read only memory (ROM) 103 which are recording media, a communication module 104, an input and output module 106, and the like, which are electrically connected to each other. Meanwhile, the optical image processing module 3 may include a display, a keyboard, a mouse, a touch panel display, and the like as the display device 4 and the input device 5, or may include a data recording device such as a hard disk drive or a semiconductor memory. In addition, the optical image processing module 3 may be constituted by a plurality of computers.

As shown in FIG. 1, the optical image processing module 3 includes an input unit 31, an image acquisition unit 32, a noise map generation unit 33, a processing unit 34, and a building unit 35. Each functional unit of the optical image processing module 3 shown in FIG. 1 is realized by loading a program (an optical image processing program of the first embodiment) on the hardware such as the CPU 101, the GPU 105, and the RAM 102 to thereby bring the communication module 104, the input and output module 106, and the like into operation under the control of the CPU 101 and the GPU 105 and read out and write data in the RAM 102. The CPU 101 and the GPU 105 of the optical image processing module 3 cause the optical image processing module 3 to function as each functional unit shown in FIG. 1 by executing this computer program, and sequentially execute processing corresponding to an optical image processing method to be described later. Meanwhile, the CPU 101 and the GPU 105 may be a single piece of hardware, or only one may be used. In addition, the CPU 101 and the GPU 105 may be implemented in a programmable logic such as an FPGA like a soft processor. The RAM or the ROM may also be a single piece of hardware, or may be built into a programmable logic such as an FPGA. Various types of data required for executing this computer program and various types of data generated by executing this computer program are all stored in a built-in memory such as the ROM 103 or the RAM 102, or a storage medium such as a hard disk drive. In addition, a built-in memory or a storage medium in the optical image processing module 3 stores in advance a plurality of trained models 36 which are read by the CPU 101 and the GPU 105 and cause the CPU 101 and the GPU 105 to execute noise removal processing on an optical image. The details of the trained models 36 will be described later. Hereinafter, there are cases in which one trained model 36 is described, but in such cases, the same applies to the other trained models 36.

Figure 3:
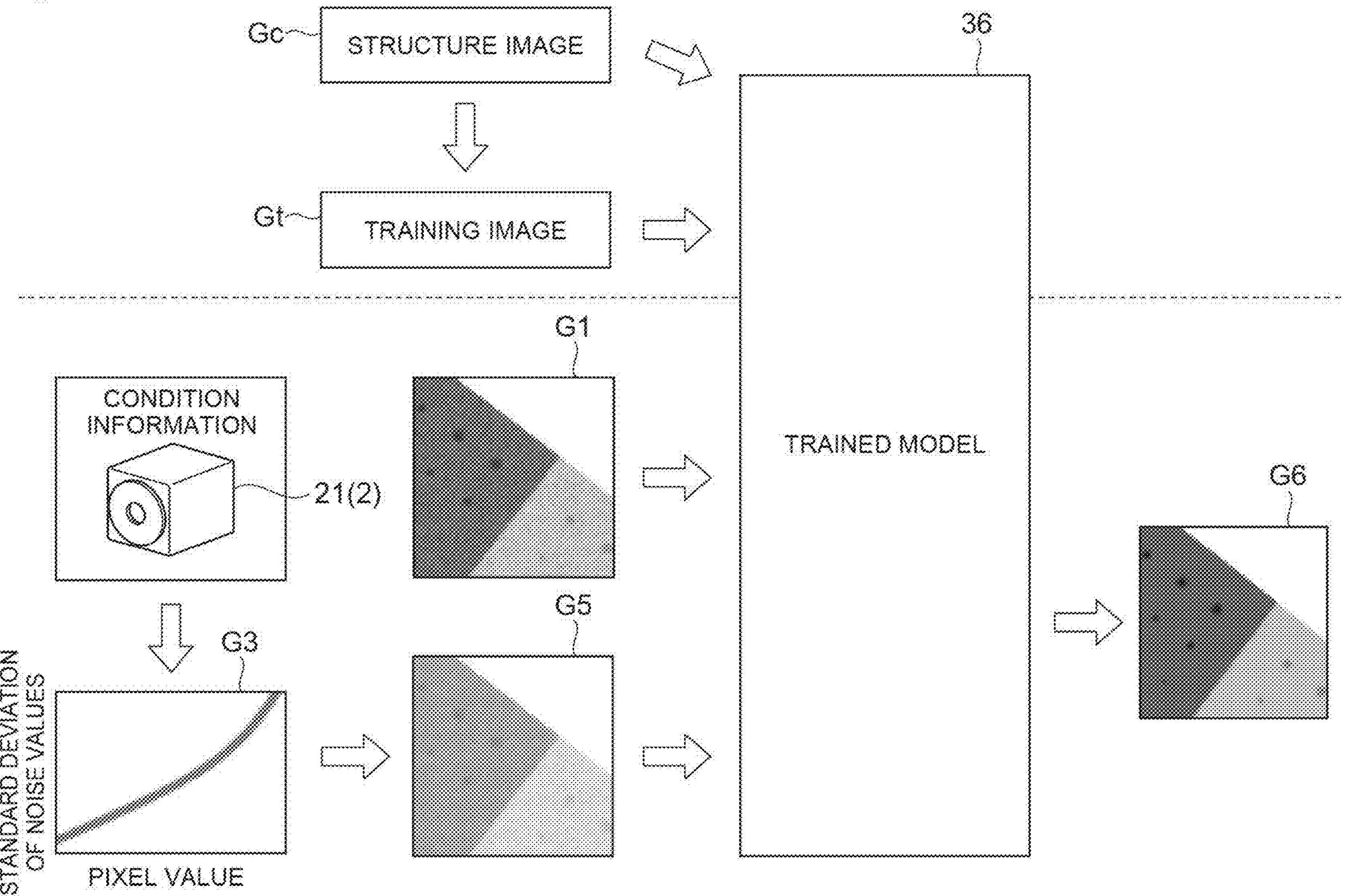
FIG. 3 is a diagram illustrating an example of input and output data of a trained model in FIG. 1.

Here, an overview of an optical image processing method of the optical image processing module 3 will be described with reference to FIG. 3. FIG. 3 is a diagram illustrating an example of input and output data of the trained model 36 in FIG. 1. In the optical image processing module 3, a plurality of trained models 36 are built in a learning phase based on machine learning, and the trained models 36 are used in a noise removal phase to generate an optical image G6 from which noise of an optical image G1 of the target object F has been removed. First, in the learning phase, the optical image processing module 3 creates a structure image (optical image) Gc which is an image of a structure having a predetermined structure, and generates a training image Gt serving as training data on the basis of the structure image Gc and a noise distribution model (the details of which will be described later). The optical image processing module 3 then builds the trained model 36 through machine learning using training data including the training image Gt or the like. In the noise removal phase, the optical image processing module 3 first acquires condition information. The condition information indicates imaging conditions including the type of photodetector 21 when an image of the target object F is captured. The optical image processing module 3 derives a relational graph G3 or the like indicating the relational expression (relationship data) between the pixel value and the standard deviation of noise values (evaluation value obtained by evaluating the spread of the noise value) on the basis of the optical image G1, the imaging conditions, and the like, and generates a noise standard deviation map (noise map) G5. The optical image processing module 3 then inputs the optical image G1 and the noise standard deviation map G5 to the trained model 36 and executes image processing of removing noise from the optical image to thereby generate and output the optical image G6 from which noise has been removed.

The details of the function of each functional unit of the optical image processing module 3 will be described below.

The input unit 31 accepts an input of the condition information. Specifically, the input unit 31 accepts an input of the condition information indicating the imaging conditions and the like of the camera 2 when an optical image of the target object F is captured from a user of the optical image processing system 1. The condition information includes at least one of photodetector information, a gain setting value, a shading correction coefficient, an offset, a noise factor, information indicating dark current noise generated due to thermal noise in the photodetector 21, and information indicating a readout noise value in the photodetector 21. The photodetector information is information indicating the type of photodetector 21 used to capture an image of the target object F. Examples of the photodetector information include information indicating any of a CCD image sensor, a CMOS image sensor, a photodiode, an InGaAs sensor, a TDI-CCD image sensor, a TDI-CMOS image sensor, an imaging tube, an EM-CCD image sensor, a EB-CMOS image sensor, an SPAD, an MPPC, an HPD, an APD, and a photomultiplier tube. The input unit 31 may accept an input of the condition information as a direct input of information such as numerical values, or may accept the input as a selective input for information such as numerical values which are set in an internal memory in advance. The input unit 31 accepts the input of the condition information from a user, but it may acquire some condition information (such as the type of photodetector 21) in accordance with the detection result of the state of control performed by the optical image processing module 3.

Figure 4:
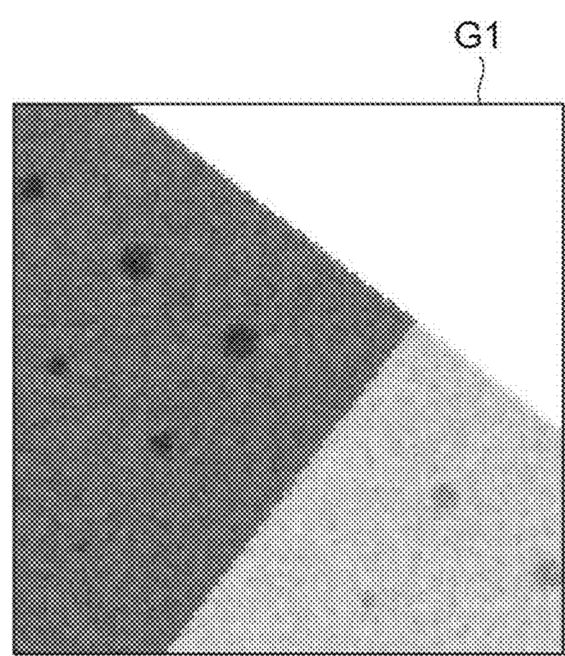
FIG. 4 is a diagram illustrating an example of an optical image acquired by an image acquisition unit.

The image acquisition unit 32 acquires an optical image obtained by capturing an image of light from the target object F. Specifically, the image acquisition unit 32 acquires the optical image output from the camera 2. FIG. 4 is a diagram illustrating an example of the optical image G1 acquired by the image acquisition unit 32.

The noise map generation unit 33 derives an evaluation value from the pixel value of each pixel in the optical image on the basis of the relationship data indicating the relationship between the pixel value and the evaluation value obtained by evaluating the spread of the noise value, and generates a noise map. The noise map is data in which the derived evaluation value is associated with each pixel in the optical image. In this case, the noise map generation unit 33 derives an evaluation value from the imaging conditions and the pixel value of each pixel in the optical image. In the present embodiment, the noise map generation unit 33 first selects one relational expression (relationship data) from a plurality of relational expressions on the basis of the imaging conditions included in the condition information acquired by the input unit 31. The noise map generation unit 33 then uses the selected relational expression to derive the standard deviation of the noise values from the pixel value of each pixel in the optical image acquired by the image acquisition unit 32. The noise map generation unit 33 then generates a noise standard deviation map by associating the derived standard deviation of the noise values with each pixel in the optical image.

Here, a process of selecting a relational expression which is performed by the noise map generation unit 33 will be described. The noise map generation unit 33 selects one relational expression from a plurality of relational expressions on the basis of the photodetector information included in the condition information. That is, the noise map generation unit 33 selects the most suitable relational expression for the photodetector 21 in accordance with the type of photodetector 21. In the present embodiment, the noise map generation unit 33 selects one relational expression from the following three relational expressions.

In a case where the photodetector 21 is not an electron multiplication type, the noise map generation unit 33 selects the following Expression (1) as a relational expression. As an example, in a case where the photodetector information indicates any of a CCD image sensor, a CMOS image sensor, a photodiode, an InGaAs sensor, a TDI-CCD image sensor, a TDI-CMOS image sensor, and an imaging tube having no photomultiplier mechanism, the noise map generation unit 33 selects the following Expression (1) as a relational expression.

[Expression 1]

$$\text{Noise} = \sqrt{\left(\sqrt{Cf \cdot \text{Signal}}\right)^2 + \left(\sqrt{D}\right)^2 + R^2} \quad (1)$$

In Expression (1), the variable Noise is the standard deviation of noise values, the constant Cf is a conversion coefficient for converting the signal value of a pixel into an electric charge in the camera 2, the variable Signal is the signal value (pixel value) of a pixel, the constant D is information indicating dark current noise, and the constant R is information indicating a readout noise value. Reference numerals commonly used in expressions to be described below are assumed to indicate the same elements, and the description thereof will be omitted.

When Expression (1) is used, the pixel value of each pixel in the optical image acquired by the image acquisition unit 32 is substituted into the variable Signal by the noise map generation unit 33. The variable Noise calculated using Expression (1) is then obtained by the noise map generation unit 33 as a numerical value of the standard deviation of the noise values. Meanwhile, other parameters in Expression (1) may be acquired by the input unit 31 accepting an input, or may be set in advance.

Figure 5:
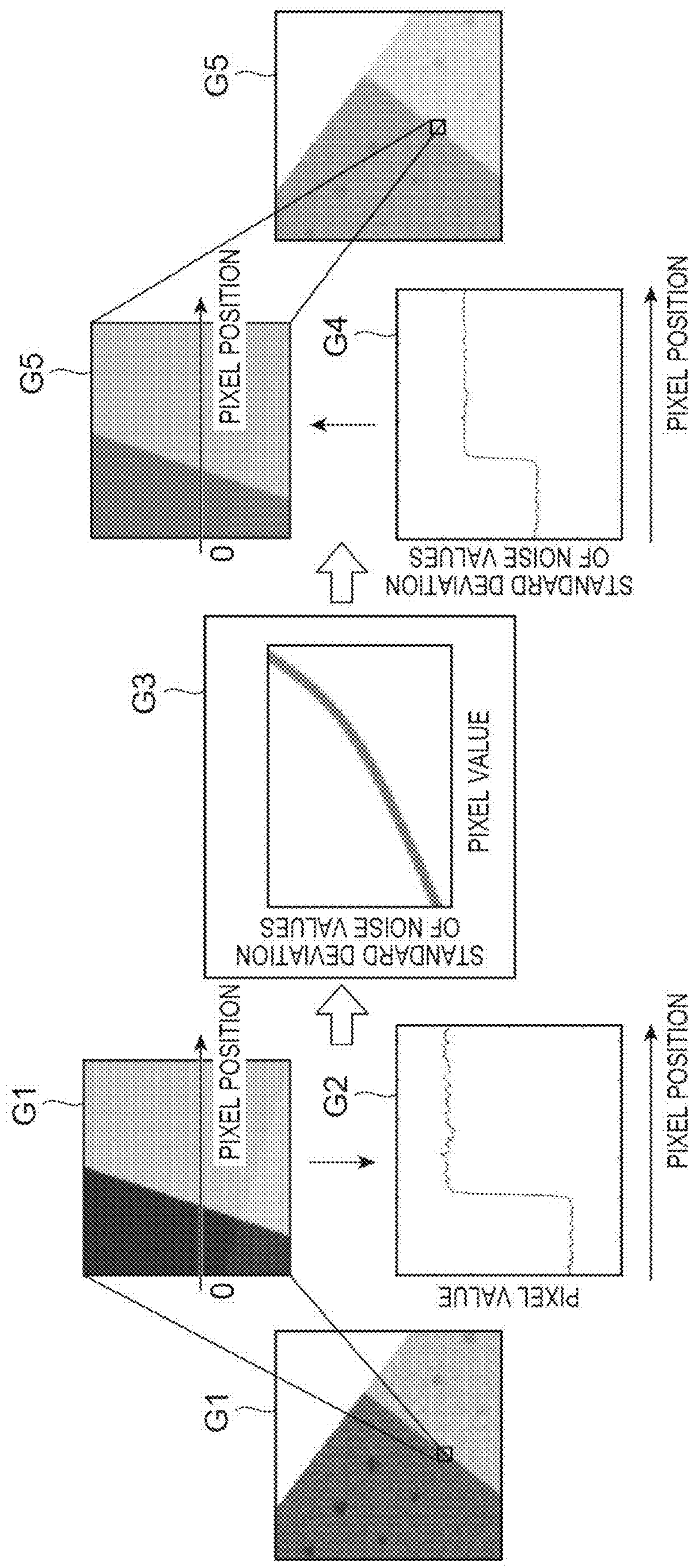
FIG. 5 is a diagram illustrating an example of generation of a noise standard deviation map performed by a noise map generation unit.

FIG. 5 is a diagram illustrating an example of generation of a noise standard deviation map which is performed by the noise map generation unit 33. The noise map generation unit 33 substitutes various pixel values into the variable Signal and acquires a correspondence relation between the pixel value and the variable Noise using the relational expression (1) between the pixel value and the standard deviation of noise values to thereby derive the relationship graph G3 indicating the correspondence relation between the pixel value and the standard deviation of noise values. The noise map generation unit 33 then derive relationship data G2 indicating the correspondence relation between each pixel position and the pixel value from the optical image G1 acquired by the image acquisition unit 32. Further, the noise map generation unit 33 derives the standard deviation of noise values corresponding to a pixel at each pixel position in the optical image by applying the correspondence relation indicating the relational graph G3 to each pixel value in the relationship data G2. As a result, the noise map generation unit 33 associates the derived standard deviation of noise with each pixel position, and derives relationship data G4 indicating the correspondence relation between each pixel position and the standard deviation of noise. The noise map generation unit 33 then generates the noise standard deviation map G5 on the basis of the derived relationship data G4.

In a case where the photodetector 21 is an electron multiplication type and not a photon counting type, the noise map generation unit 33 selects the following Expression (2) as a relational expression. As an example, in a case where the photodetector information indicates any of an EM-CCD an image sensor, an EB-CMOS image sensor, an SPAD, an HPD, an APD, a photomultiplier tube, and an MPPC, the noise map generation unit 33 selects the following Expression (2) as a relational expression.

[Expression 2]

$$\text{Noise} = \sqrt{\left(F\sqrt{G \cdot Cf \cdot \text{Signal}}\right)^2 + \left(F \cdot G\sqrt{D}\right)^2 + R^2} \qquad (2)$$

In Expression (2), the constant F is a noise factor, and the constant G is information indicating a gain setting value. When Expression (2) is used, as in the case of Expression (1), the pixel value of each pixel in the optical image acquired by the image acquisition unit 32 is substituted into the variable Signal by the noise map generation unit 33. The variable Noise calculated using Expression (2) is then obtained by the noise map generation unit 33 as a numerical value of the standard deviation of noise values. Meanwhile, each of the constant F and the constant G in Expression (2) may be acquired by the input unit 31 accepting an input, or may be set in advance. The noise map generation unit 33 substitutes various pixel values into the variable Signal and acquires the correspondence relation between the pixel value and the variable Noise using Relational expression (2) as in the case where Expression (1) is selected, to thereby derive the relational graph G3, and derive the relationship data G2 and the relationship data G4 and generate the noise standard deviation map G5 using the same method as in the case where Expression (1) is selected.

In a case where the photodetector 21 is an electron multiplication type and a photon counting type, the noise map generation unit 33 selects the following Expression (3) as a relational expression. As an example, in a case where the photodetector information operates for the purpose of photon counting by using a photomultiplier tube, an HPD, an MPPC, or the like, the noise map generation unit 33 selects the following Expression (3) as a relational expression.

[Expression 3]

$$\text{Noise} = \sqrt{\left(F\sqrt{G \cdot Cf \cdot \text{Signal}}\right)^2 + \left(F \cdot G\sqrt{D}\right)^2} \qquad (3)$$

In Expression (3), the variable Signal is information indicating a photon counting number. When Expression (3) is used, as in the case of Expression (1), the pixel value of each pixel in the optical image acquired by the image acquisition unit 32 is substituted into the variable Signal by the noise map generation unit 33. The variable Noise calculated using Expression (3) is then obtained by the noise map generation unit 33 as a numerical value of the standard deviation of noise values. The noise map generation unit 33 substitutes various pixel values into the variable Signal and acquires the correspondence relation between the pixel value and the variable Noise using Relational expression (3) as in the case where Expression (1) is selected, to thereby derive the relational graph G3, and derive the relationship data G2 and the relationship data G4 and generate the noise standard deviation map G5 using the same method as in the case where Expression (1) is selected.

The processing unit 34 inputs the optical image and the noise map to the trained model 36 built in advance through machine learning, and executes image processing of removing noise from the optical image. That is, as shown in FIG. 3, the processing unit 34 acquires the trained model 36 built by the building unit 35 from the built-in memory or storage medium in the optical image processing module 3. In the present embodiment, the processing unit 34 acquires the trained model 36 corresponding to the type of photodetector 21 from the plurality of trained models 36. The processing unit 34 then inputs the optical image G1 acquired by the image acquisition unit 32 and the noise standard deviation map G5 generated by the noise map generation unit 33 to the trained model 36. Thereby, the processing unit 34 executes image processing of removing noise from the optical image G1 using the trained model 36 to generate the optical image G6 from which noise has been removed. The processing unit 34 then outputs the generated optical image G6 to the display device 4 or the like.

The building unit 35 uses a structure image to which noise is added based on a predetermined noise distribution model as a training image and uses the training image, a noise map generated from the training image on the basis of a relational expression between a pixel value and the standard deviation of noise values, and noise-removed image data which is data obtained by removing noise from the training image, as training data, to build a trained model 36 that outputs the noise-removed image data on the basis of the training image and the noise map through machine learning. In the present embodiment, the building unit 35 builds the trained model 36 in accordance with the type of photodetector 21. The building unit 35 then stores each built trained model 36 in the built-in memory or storage medium in the optical image processing module 3. Examples of machine learning include supervised learning, unsupervised learning, and reinforcement learning, including deep learning, neural network learning, and the like. In the first embodiment, the two-dimensional convolutional neural network described in the paper "Beyond a Gaussian Denoiser: Residual Learning of Deep CNN for Image Denoising" authored by Kai Zhang et al. is adopted as an example of a deep learning algorithm. Meanwhile, each trained model 36 may be generated by an external computer or the like and downloaded to the optical image processing module 3 in addition to being built by the building unit 35. Meanwhile, the optical image used for machine learning includes an optical image obtained by capturing an image of a known structure or an image obtained by reproducing the optical image. The training image may be an image actually generated for multiple types of known structures, or may be an image generated by simulation calculation.

As preprocessing for performing machine learning, the building unit 35 generates a structure image to which noise is added based on a noise distribution model as a training image. The building unit 35 then derives an evaluation value from the pixel value of each pixel in the optical image on the basis of the relationship data indicating the relationship between the pixel value and the evaluation value obtained by evaluating the spread of the noise value, and generates a noise map which is data in which the derived evaluation value is associated with each pixel in the optical image.

Specifically, when each trained model 36 is built, the building unit 35 acquires condition information including photodetector information during simulation calculation from the input unit 31. The building unit 35 then generates a structure image. The building unit 35 then adds noise to the structure image on the basis of the noise distribution model selected on the basis of the photodetector information. The building unit 35 then generates a noise standard deviation map on the basis of the training image using the same method as the method performed by the noise map generation unit 33 shown in FIG. 5. That is, the machine learning preprocessing method includes an input step of accepting an input of condition information including photodetector information indicating the type of photodetector 21 used to capture an image of the target object F, a training image generation step of generating a structure image to which noise is added based on the noise distribution model as a training image, and a noise map generation step of deriving an evaluation value from the pixel value of each pixel in the optical image on the basis of the relationship data indicating the relationship between the pixel value and the evaluation value obtained by evaluating the spread of the noise value and generating a noise map which is data in which the derived evaluation value is associated with each pixel in the optical image. In the training image generation step, the noise distribution model to be used is determined from the photodetector information.

The building unit 35 builds each trained model 36 through machine learning using the training data prepared for each trained model 36. Specifically, the building unit 35 first acquires in advance the noise-removed image data obtained by removing noise from the training image. The building unit 35 uses the image before noise is added in the process of generating the training image as the noise-removed image data. The building unit 35 builds a trained model 36 that outputs the noise-removed image data on the basis of the training image and the noise standard deviation map by executing training through machine learning.

Figure 6:
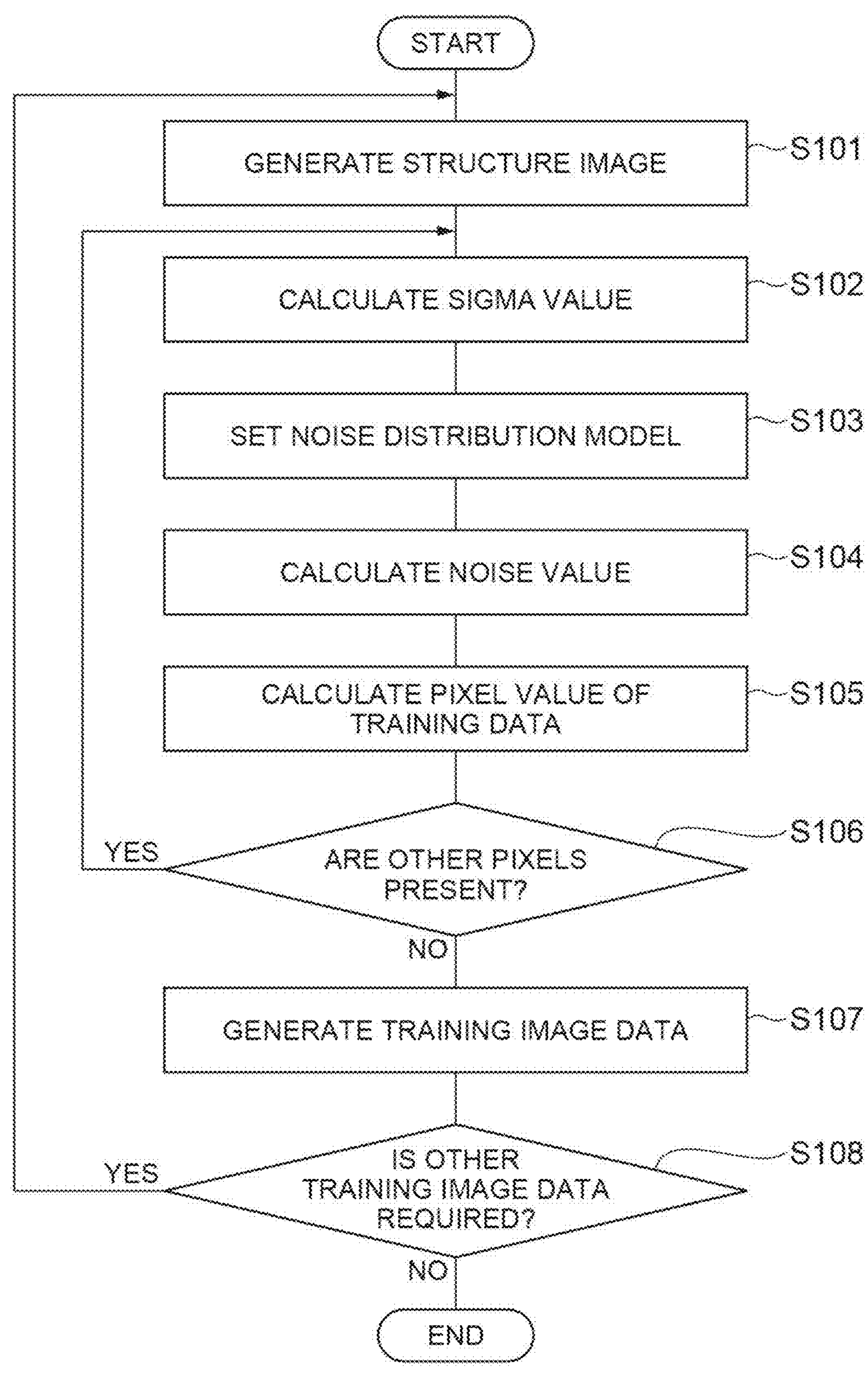
FIG. 6 is a flowchart illustrating a procedure of creating a training image included in training data which is used to build a trained model by a building unit.

FIG. 6 is a flowchart illustrating a procedure of creating a training image included in training data used to build the trained model 36 by the building unit 35.

A training image (also referred to as a training image) which is training data is created in the next procedure. First, the building unit 35 generates a structure image (step S101). The building unit 35 may, for example, create a structure image through simulation calculation. Next, a sigma value which is a standard deviation of pixel values is calculated for one pixel selected from a plurality of pixels constituting the structure image (step S102). The sigma value calculated in step S102 indicates the magnitude of noise. Similarly to the method of generating the noise map described above, the building unit 35 selects a suitable relational expression from Expression (1), Expression (2), and Expression (3) on the basis of the photodetector information. Using the selected relational expression, the building unit 35 substitutes the pixel value of a pixel of the structure image into the variable Signal, calculates the variable Noise of the pixel, and obtains the calculated variable Noise of the pixel as the magnitude of noise (sigma value).

The building unit 35 then sets a noise distribution model on the basis of the sigma value obtained in step S102 (step S103). The building unit 35 acquires condition information from the input unit 31 and sets the noise distribution model in accordance with the photodetector information included in the condition information.

Examples of the noise distribution model include a normal distribution model, a Poisson distribution model, and a Bessel function distribution model. In addition, the condition information further includes information indicating the amount of the light L. The building unit 35 refers to the photodetector information to set the normal distribution model as the noise distribution model in a case where the photodetector 21 is not an electron multiplication type and the amount of the light L is not small. In addition, in a case where the photodetector 21 is not an electron multiplication type and the amount of the light L is small, the building unit 35 sets the Poisson distribution model as the noise distribution model. As an example, the building unit 35 sets the normal distribution model as the noise distribution model in a case where the photodetector information is any of a CCD image sensor, a CMOS image sensor, a photodiode, an InGaAs sensor, a TDI-CCD image sensor, a TDI-CMOS image sensor, and an imaging tube having no photomultiplier mechanism and the amount of light is equal to or greater than a reference value determined in advance. In addition, as an example, the building unit 35 refers to the condition information to set the Poisson distribution model as the noise distribution model in a case where the photodetector information is any of a CCD image sensor, a CMOS image sensor, a photodiode, an InGaAs sensor, a TDI-CCD image sensor, a TDI-CMOS image sensor, and an imaging tube and the amount of light is less than the reference value. Meanwhile, the noise distribution model may include only one of the normal distribution model and the Poisson distribution model. On the other hand, the building unit 35 sets the Bessel function distribution model as the noise distribution model in a case where the photodetector 21 is a multi-stage electron multiplication type with a multiplication factor of 2 per stage. As an example, the building unit 35 sets the Bessel function distribution model as the noise distribution model in a case where the photodetector information is an EM-CCD image sensor. By setting the normal distribution model or the Bessel function distribution model in this way, it is possible to generate training data with various noise conditions. Meanwhile, in a case where the photodetector information does not correspond to any of the above photodetectors, the building unit 35 may create a new noise distribution model by calculating a histogram and creating a function indicating the noise distribution. The histogram is a histogram of pixel values of an optical image when light having the same amount of light is caused to be incident on the photodetector 21. The building unit 35 calculates the histogram, for example, by acquiring a plurality of optical images obtained by capturing an image of a light source of which the amount of light does not change over time. As an example, the horizontal axis of the histogram is the luminance value of the camera 2, and the vertical axis of the histogram is a frequency. Since the noise distribution varies depending on the amount of light, the building unit 35 further acquires a plurality of histograms by changing the amount of light of the light source within the range of the amount of light that can be assumed during use of the optical image processing system 1, and creates a noise distribution model.

Subsequently, the building unit 35 calculates a randomly set noise value on the basis of the magnitude of noise (sigma value) acquired in step S102 and the noise distribution model set on the basis of the sigma value in step S103 (step S104). Subsequently, the building unit 35 adds the noise value obtained in step S104 to the pixel value of one pixel to generate pixel values constituting a training image which is training data (step S105). The building unit 35 performs the processes of steps S102 to S105 on each of the plurality of pixels constituting the structure image (step S106), and generates a training image serving as training data (step S107). In addition, in a case where more training images are required, the processes of steps S101 to S107 are determined to be performed on another structure image (step S108), and another training image serving as training data is generated. Meanwhile, another structure image may be an image of a structure having the same structure, or may be an image of a structure having a different structure.

Meanwhile, it is necessary to prepare a large number of training images which are training data used to build the trained model 36. In addition, the structure image is preferably an image with little noise, ideally an image with no noise. Therefore, generating a structure image through simulation calculation enables a large number of noise-free images to be generated, and thus generating a structure image through simulation calculation is effective.

Figure 7:
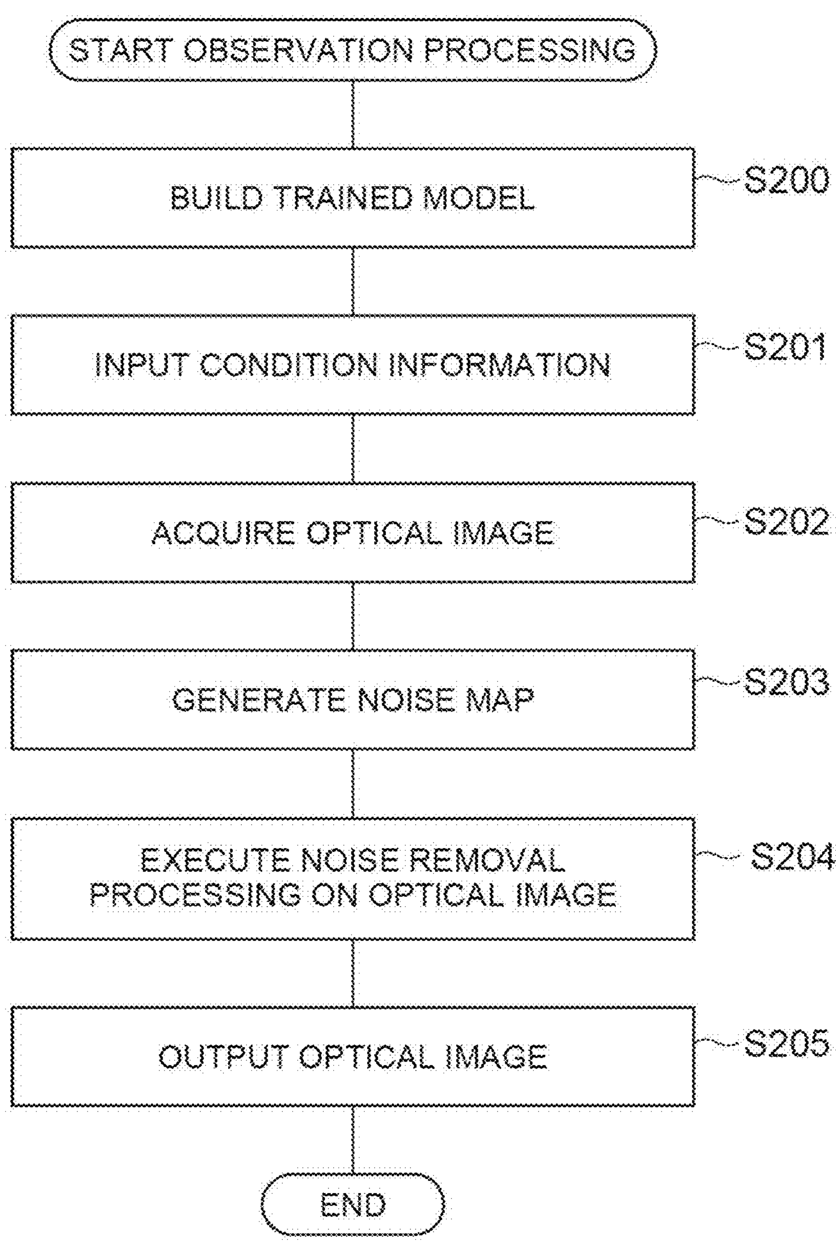
FIG. 7 is a flowchart illustrating a procedure of observation processing performed by the optical image processing system including an optical image processing module.

Next, a procedure of observation processing of an optical image of the target object F using the optical image processing system 1 according to the first embodiment, that is, a flow of the optical image acquisition method according to the first embodiment will be described. FIG. 7 is a flowchart illustrating a procedure of observation processing performed by the optical image processing system 1 including the optical image processing module 3.

First, the building unit 35 uses the training image, the noise standard deviation map generated from the training image on the basis of the relational expression, and the noise-removed image data as training data to build a trained model 36 that outputs the noise-removed image data on the basis of the training image and the noise standard deviation map through machine learning (step S200). In the present embodiment, a plurality of trained models 36 are built. Next, the input unit 31 accepts an input of condition information indicating imaging conditions and the like from an operator (user) of the optical image processing system 1 (step S201).

Subsequently, the target object F is set and an image of the target object F is captured in the optical image processing system 1, and an optical image of the target object F is acquired by the optical image processing module 3 (step S202). Further, the optical image processing module 3 derives the standard deviation of noise values from the pixel value of each pixel in the optical image on the basis of the relational expression between the pixel value and the standard deviation of noise values and associates the derived standard deviation of noise with each pixel value, to thereby generate a noise standard deviation map (step S203).

Next, the processing unit 34 inputs the optical image of the target object F and the noise standard deviation map to the trained model 36 that has been built and stored in advance, and executes noise removal processing on the optical image (step S204). Further, the processing unit 34 outputs the optical image that has undergone noise removal processing to the display device 4 (step S205).

According to the optical image processing module 3 described above, the standard deviation of noise values is derived from the pixel value of each image of the optical image using a relational expression (relationship data) indicating the relationship between the pixel value and the standard deviation of noise values obtained by evaluating the spread of the noise value, and a noise standard deviation map that is data in which the derived standard deviation of noise values is associated with each pixel in the optical image is generated. The optical image and the noise standard deviation map are then input to the trained model 36 built in advance through machine learning, and image processing of removing noise from the optical image is executed. This makes it possible to realize noise removal corresponding to the relationship between the pixel value the spread of noise in the optical image using the trained model 36. As a result, it is possible to effectively remove noise in the optical image.

In particularly, the optical image has its noise pattern changed depending on differences in the type of photodetector 21, a gain setting value, a readout mode, and the like. For this reason, in a case where noise removal is attempted to be realized through machine learning, preparation of a learning model trained under various conditions can be considered. In such a case, a learning model must be built for each noise condition such as, for example, the type of photodetector 21, a gain setting value, and a readout mode, and a huge number of learning models are required to be generated, which may take a long time to perform building. In this regard, according to the present embodiment, by generating a noise map from the optical image and using the noise map as input data for machine learning, it is possible to reduce the noise conditions that require the generation of the trained model 36, and to greatly reduce the learning time to build the trained model 36.

Here, an example of the effect of noise removal processing performed by the optical image processing module 3 of the first embodiment will be described. For example, in an example in which a CMOS image sensor (C13440-20 ORCA (registered trademark)-Flash4.0 V3 manufactured by Hamamatsu Photonics K.K.) is used as the photodetector 21, and the target object F is irradiated with visible light as observation light, the standard deviation of noise in the optical image G1 (see FIG. 3) was 3.31, and the standard deviation of noise in the optical image G6 was 0.48. In an example in which a CMOS image sensor (C14440-20 ORCA (registered trademark)-Fusion manufactured by Hamamatsu Photonics K.K.) different from the above CMOS image sensor is used as the photodetector 21, and the target object F is irradiated with visible light as observation light, the standard deviation of noise in the optical image G1 was 6.91, and the standard deviation of noise in the optical image G6 was 0.79. In an example in which a CMOS image sensor (C15440-20 ORCA (registered trademark)-FusionBT manufactured by Hamamatsu Photonics K.K.) different from the two CMOS image sensors is used as the photodetector 21, and the target object F is irradiated with visible light as observation light, the standard deviation of noise in the optical image G1 was 6.91, and the standard deviation of noise in the optical image G6 was 0.69. In an example where an InGaAs sensor (C12741-03 InGaAs camera manufactured by Hamamatsu Photonics K.K.) is used as the photodetector 21, and the target object F is irradiated with infrared light as observation light, the standard deviation of noise in the optical image G1 was 7.54, and the standard deviation of noise in the optical image G6 was 1.53. Meanwhile, in each of the above examples, the photodetector 21 which is not an electron multiplication type is used, and thus the normal distribution model is set as the noise distribution model.

In an example in which an EM-CCD image sensor (C9100-23B ImagEM (registered trademark) X2 EM-CCD camera manufactured by Hamamatsu Photonics K.K.) is used as the photodetector 21, the amplification factor is 300 times, and the target object F is irradiated with visible light as observation light, the following results were obtained. Specifically, in a case where the digital output value was 2,200 (count), the standard deviation of noise in the optical image G1 was 41.5, and the standard deviation of noise in the optical image G6 was 5.66. In addition, in a case where the digital output value was 2,500 (count), the standard deviation of noise in the optical image G1 was 44.1, and the standard deviation of noise in the optical image G6 was 7.74.

Figure 8:
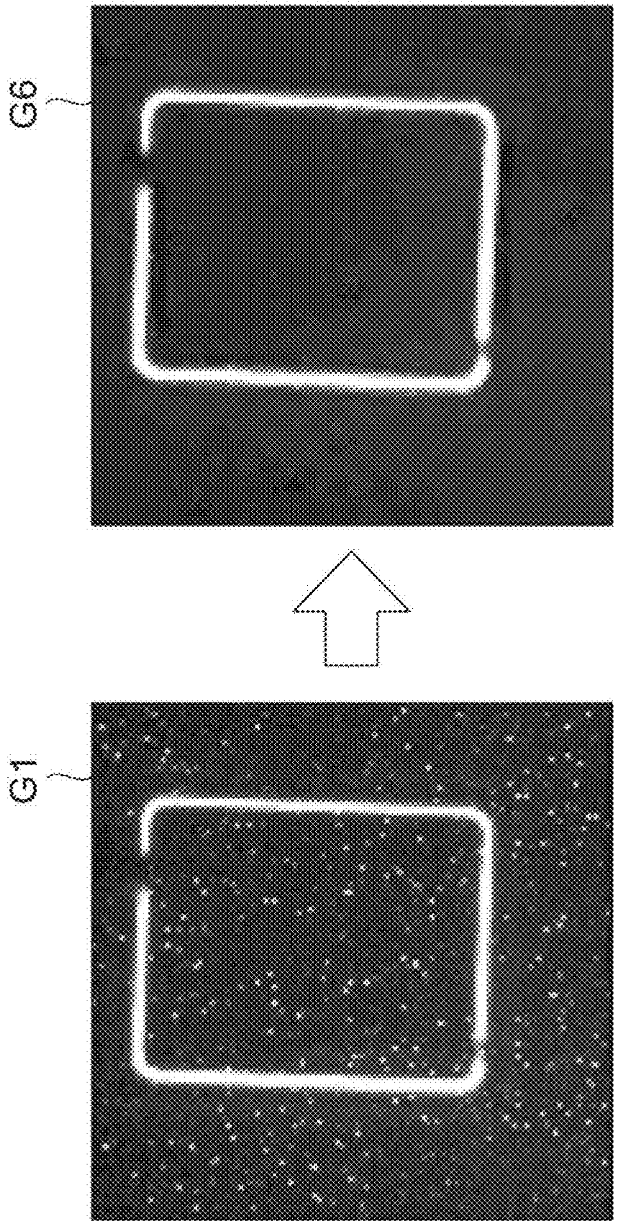
FIG. 8 is a diagram illustrating an example of optical images acquired by the image acquisition unit before and after noise removal processing.

In addition, in an example where the amplification factor is 1,200 times under the above condition, the following results were obtained. Specifically, in a case where the digital output value was 2,200 (count), the standard deviation of noise in the optical image G1 was 86.9, and the standard deviation of noise in the optical image G6 was 13.5. In addition, in a case where the digital output value was 2,500 (count), the standard deviation of noise in the optical image G1 was 91.5, and the standard deviation of noise in the optical image G6 was 15.7. Meanwhile, in each of the above examples, the electron multiplication-type photodetector 21 is used, and thus the Bessel function distribution model is set as the noise distribution model. FIG. 8 shows the optical image G1 and the optical image G6 in a case where an SPAD sensor is used as the photodetector 21 and the target object F is irradiated with visible light as observation light. The standard deviation of noise in the optical image G1 was 30, and the standard deviation of noise in the optical image G6 was 5.8.

As shown in each of the above examples, according to the optical image processing module 3 of the first embodiment, it is possible to obtain the optical image G6 from which noise in the optical image G1 is effectively removed by creating a noise map corresponding to the actually measured noise value.

The optical image processing module 3 of the first embodiment includes the input unit 31 that accepts an input of condition information indicating imaging conditions when an image of the target object F is captured. The noise map generation unit 33 derives the standard deviation of noise values from the imaging conditions and the pixel value of each pixel in the optical image, and the condition information includes information indicating the type of photodetector 21 used to capture an image of the target object F. The relationship between the pixel value and noise in the optical image varies depending on the type of photodetector 21 used to capture an image of the target object F. According to the above configuration, the spread of the noise value in the pixel value of each pixel in the optical image is evaluated in consideration of the type of photodetector 21 used to capture an image of the target object F, and thus it is possible to realize noise removal corresponding to the relationship between the pixel value and the spread of noise in the optical image. As a result, it is possible to more effectively remove noise in the optical image.

In the optical image processing module 3 of the first embodiment, the spread of the noise value is evaluated as the standard deviation of the noise values. Thereby, the spread of the noise value in the pixel value of each pixel in the optical image is evaluated more accurately, and thus it is possible to realize noise removal corresponding to the relationship between the pixel value and noise. As a result, it is possible to more effectively remove noise in the optical image.

The optical image processing module 3 of the first embodiment includes the building unit 35 that uses a structure image to which noise is added based on a predetermined noise distribution model as a training image and uses a noise standard deviation map generated from the training image on the basis of relationship data and noise-removed image data which is data obtained by removing noise from the training image as training data to build a trained model 36 that outputs the noise-removed image data on the basis of the training image and the noise standard deviation map through machine learning. According to the above configuration, a trained model 36 that realizes noise removal corresponding to the relationship between the pixel value and the spread of noise can be built using an optical image which is a training image, a noise map generated from the image, and the noise-removed image data. As a result, noise in the optical image of the target object F can be more effectively removed using the trained model 36.

The optical image processing module 3 of the first embodiment has a machine learning preprocessing function of generating a structure image to which noise is added based on a noise distribution model as a training image, deriving the standard deviation of noise values from the pixel value of each pixel in the structure image on the basis of relationship data, and generating a noise standard deviation map that is data in which the derived standard deviation of noise values is associated with each pixel in the optical image. According to such a configuration, the noise standard deviation map which is training data for the above machine learning method corresponds to the relationship between the pixel value and the standard deviation of noise values obtained by evaluating the spread of the noise value. Thereby, when the optical image and the noise standard deviation map generated from the optical image are input to the trained model 36 built using the training image and the noise map generated through the above preprocessing method, it is possible to realize noise removal corresponding to the relationship between the pixel value and the spread of noise. As a result, it is possible to more effectively remove noise in the optical image of the target object F.

The optical image processing module 3 of the first embodiment has a function of accepting an input of condition information including photodetector information indicating the type of photodetector 21 used to capture an image of the target object F, and a function of determining a noise distribution model to be used from the photodetector information in a process of generating a training image. The relationship between the pixel value and noise in the optical image varies depending on the type of photodetector 21 used to capture an image of the target object F. According to the above configuration, it is possible to obtain a training image in which noise is appropriately added to the structure image in consideration of the type of photodetector 21 used to capture an image of the target object F.

In the optical image processing module 3 of the first embodiment, the noise distribution model includes a normal distribution model and a Poisson distribution model. Thereby, for example, in a case where the general photodetector 21 which is not an electron multiplication type is used to capture an image of the target object F, it is possible to obtain a training image in which noise is appropriately added to the structure image. In particular, since the noise distribution model further includes a Poisson distribution model in addition to the normal distribution model, it is possible to obtain a training image in which noise is appropriately added to the structure image even in a case where the amount of the light L is small.

In the optical image processing module 3 of the first embodiment, the noise distribution model includes a Bessel function distribution model. Thereby, for example, in a case where the electron multiplication-type photodetector 21 is used to capture an image of the target object F, it is possible to obtain a training image in which noise is appropriately added to the structure image.

In a case where the electron multiplication-type photodetector 21 is used, the noise distribution changes in accordance with multiplication fluctuations that occur during multiplication. In the first embodiment, the Bessel function distribution model is applied in a case where the photodetector 21 is an electron multiplication type, and thus it is possible to generate a training image to which noise is added appropriately.

Second Embodiment

Figure 9:
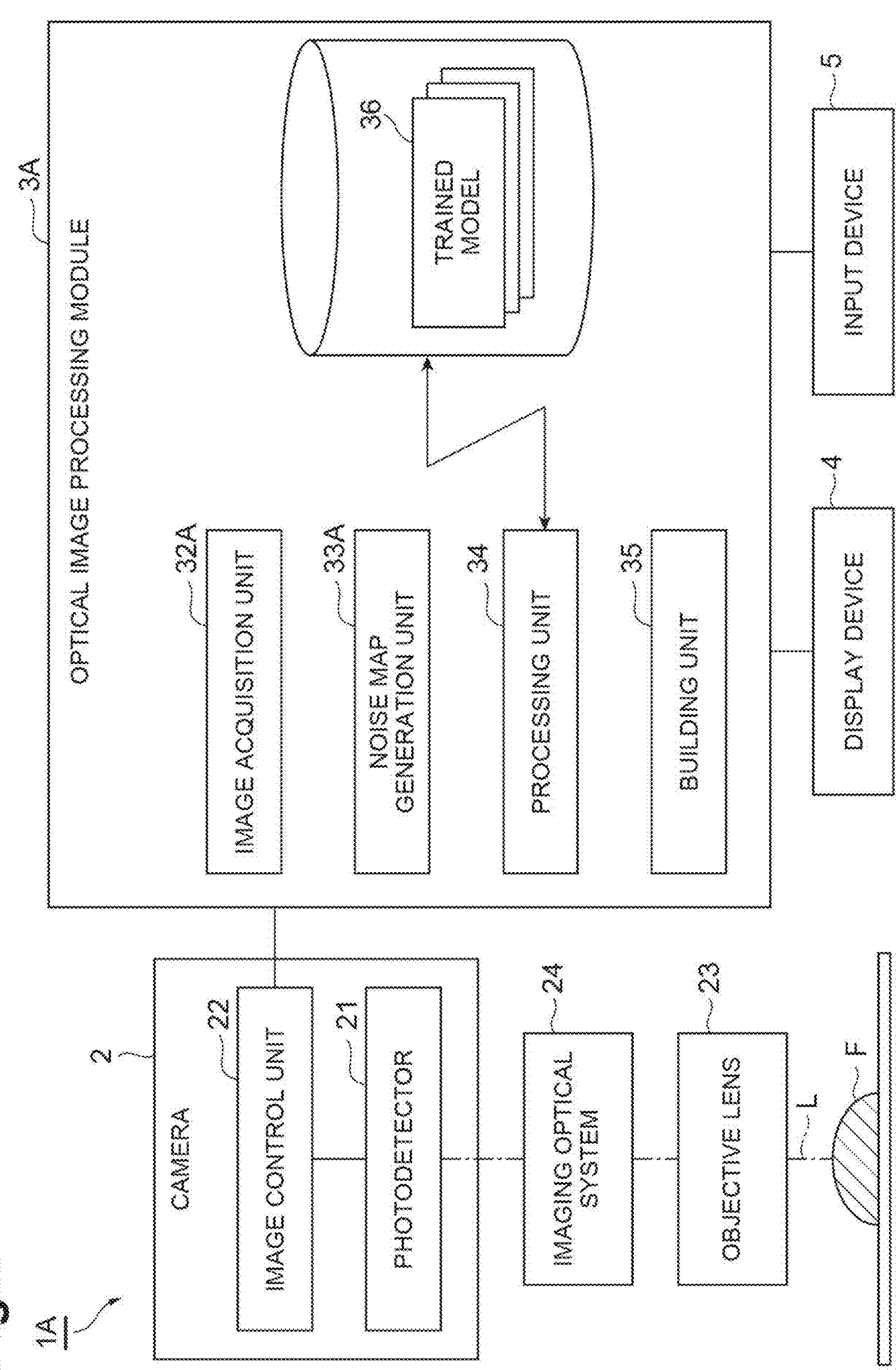
FIG. 9 is a block diagram illustrating a functional configuration of an optical image processing system according to a second embodiment.
Figure 10:
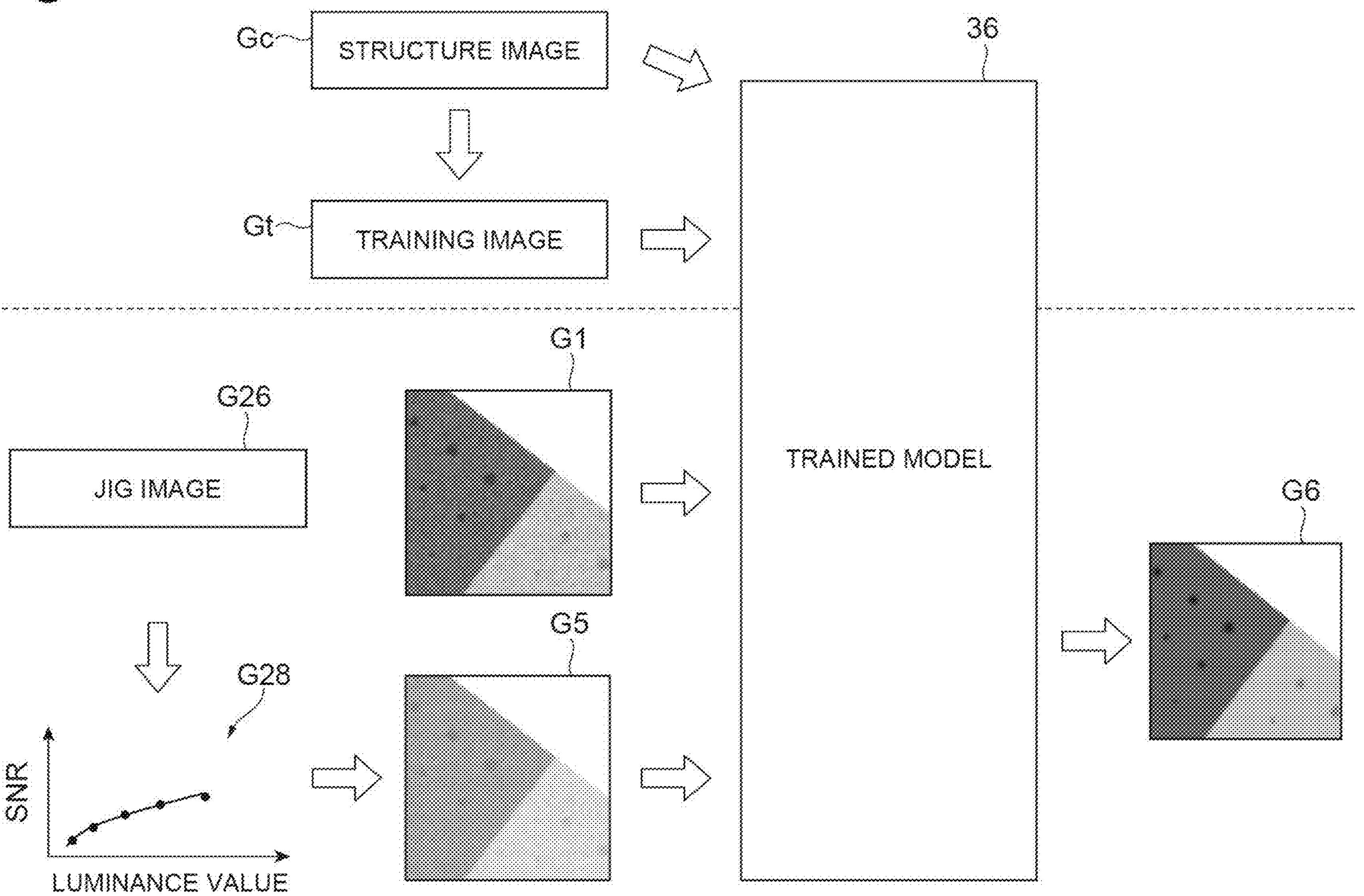
FIG. 10 is a diagram illustrating an example of input and output data of a trained model in FIG. 9.

FIG. 9 is a block diagram illustrating a functional configuration of an optical image processing system 1A according to a second embodiment. FIG. 10 is a diagram illustrating an example of input and output data of a trained model 36 in FIG. 9. The optical image processing module 3A of the second embodiment is different from the above-described first embodiment in that an image acquisition unit 32A has a function of acquiring an optical image of a jig and that a noise map generation unit 33A has a function of deriving a graph indicating the relationship between the pixel value and the standard deviation of noise values from the optical image of the jig. Specifically, as shown in FIG. 10, in the noise removal phase, the optical image processing module 3A acquires a jig image G26 which is an optical image of the jig. The optical image processing module 3A plots the relationship between the true pixel value and SNR for each of a plurality of pixels included in the jig image G26 on a graph G28 and draws an approximation curve on the basis of the jig image G26, to thereby derive a relational graph indicating the relationship between the pixel value and the standard deviation of noise values and generate a noise standard deviation map G5.

Figure 11:
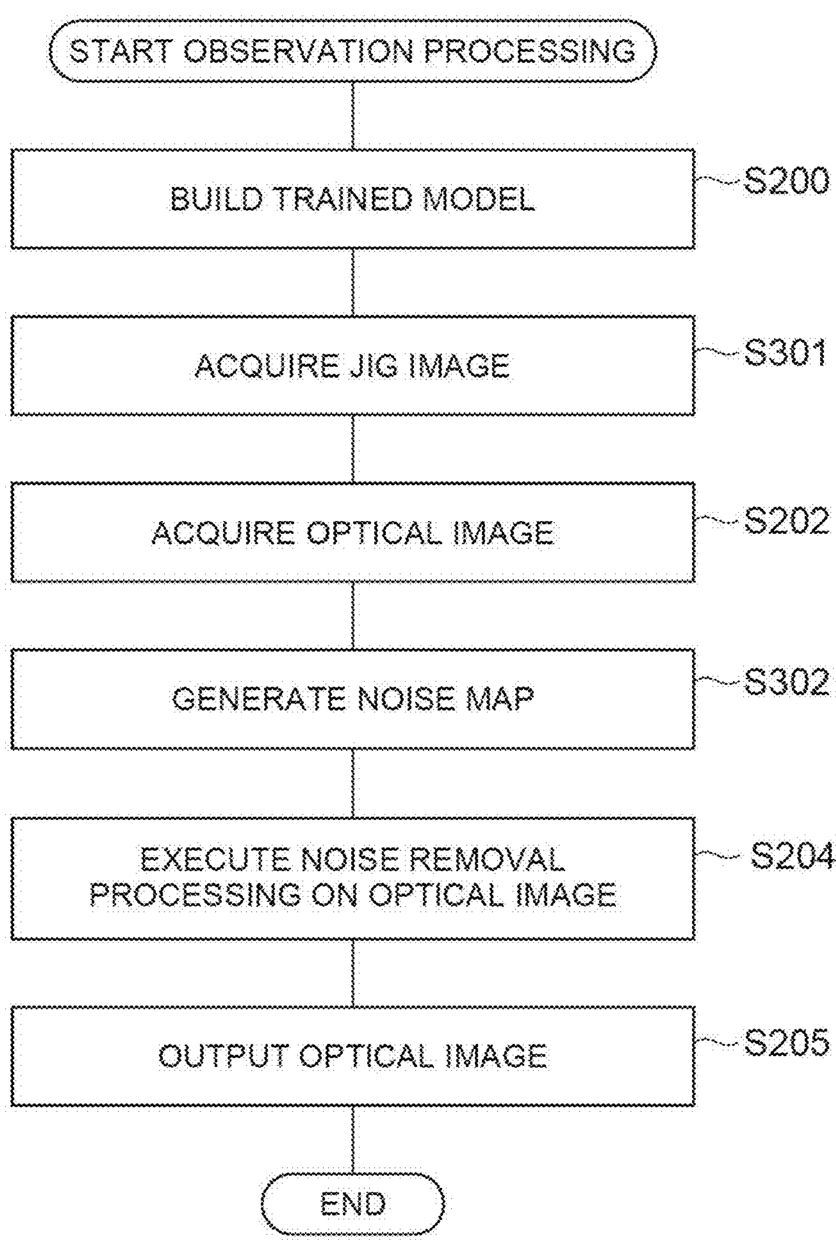
FIG. 11 is a flowchart illustrating a procedure of observation processing performed by the optical image processing system including an optical image processing module.

FIG. 11 is a flowchart illustrating a procedure of observation processing performed by the optical image processing system 1A including the optical image processing module 3A in FIG. 10. As shown in FIG. 11, in the optical image processing module 3A according to the second embodiment, the processes shown in steps S301 and S302 are executed in place of the processes of steps S201 and S203 performed by the optical image processing module 3 of the first embodiment shown in FIG. 7.

Figure 12:
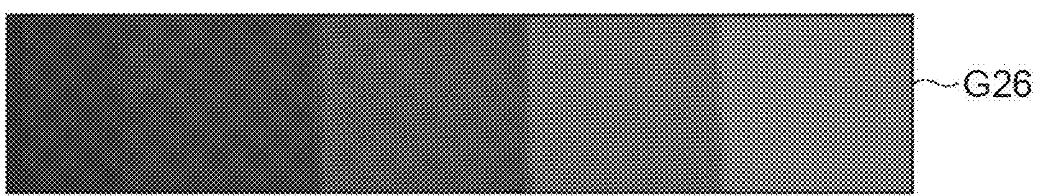
FIG. 12 is a diagram illustrating an example of a jig image used to evaluate a luminance-to-noise ratio.

The image acquisition unit 32A acquires an optical image of the jig by capturing an image of light from the jig (step S301). Specifically, the image acquisition unit 32A acquires an optical image obtained by capturing an image of light from the jig using the camera 2. Examples of the light from the jig include light emitted from the jig, transmitted light from the jig, reflected light from the jig, scattered light from the jig, and the like. As shown in FIG. 12, the jig to be used is a jig having a grayscale chart that enables evaluation of gradation performance with density steps that change step by step. That is, the image acquisition unit 32A acquires the jig image G26 captured using the camera 2 in advance of the observation processing of the target object F. The image acquisition unit 32A then acquires an optical image of the target object F captured using the camera 2. However, the timing of acquisition of optical images of the jig and the target object F is not limited to the above, and may be simultaneous or opposite.

The noise map generation unit 33A derives relationship data indicating the relationship between the pixel value and the evaluation value obtained by evaluating the spread of the noise value on the basis of the optical image of the jig obtained as a result of capturing an image of the jig (step S302). Specifically, the noise map generation unit 33A derives a noise standard deviation map indicating the relationship between the pixel value and the standard deviation of noise values from the optical image of the jig.

Figure 13:
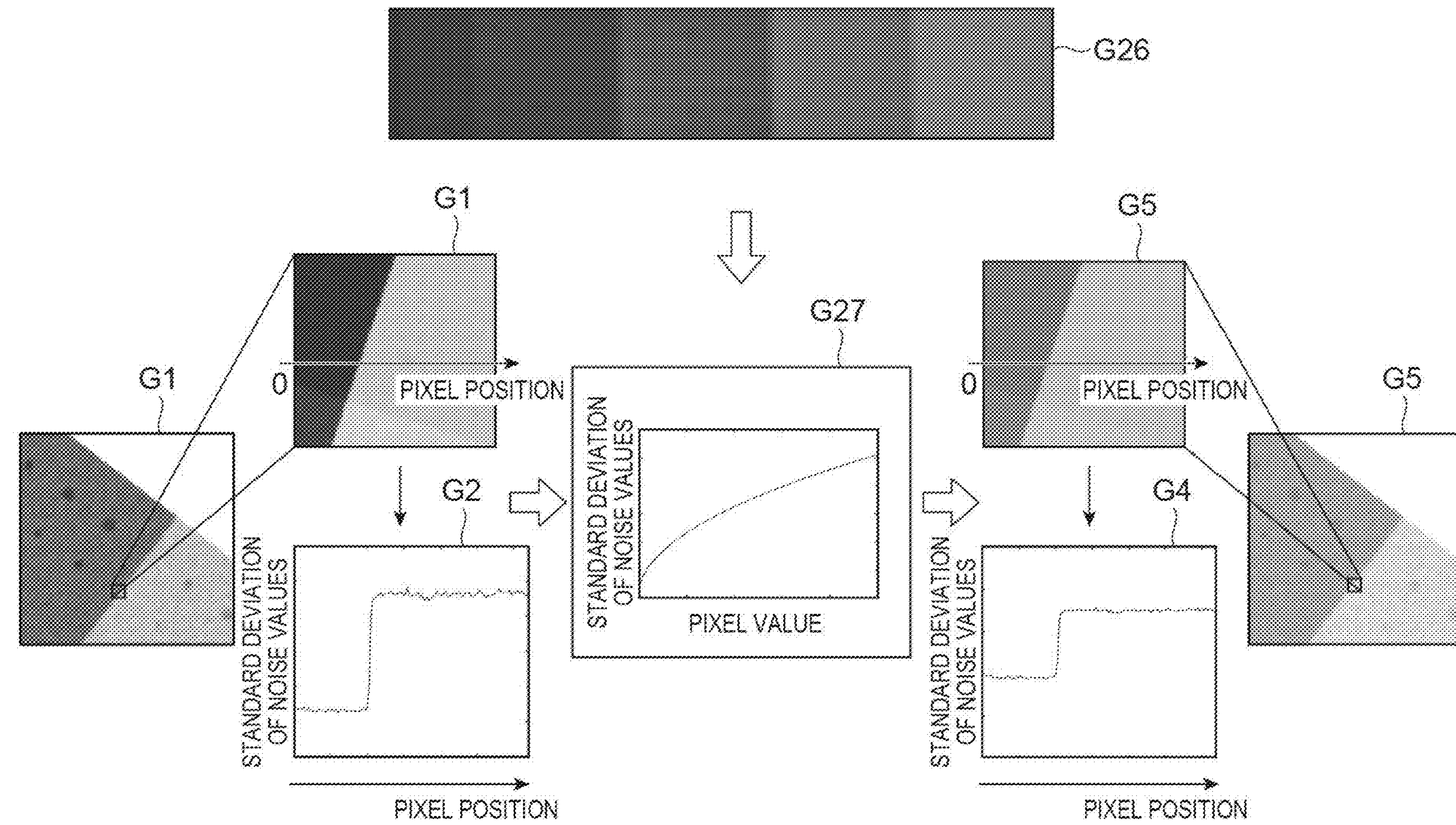
FIG. 13 is a diagram illustrating an example of generation of a noise standard deviation map which is performed by the noise map generation unit.

FIG. 13 is a diagram illustrating an example of generation of a noise standard deviation map which is performed by the noise map generation unit 33A. The noise map generation unit 33A plots the relationship between the true pixel value and SNR for each of a plurality of measurement regions with densities different from each other included in the jig image G26 on the graph G28 (see FIG. 10) and draws an approximation curve, to thereby derive a relational graph G27 indicating the relationship between the pixel value and the standard deviation of noise values. Specifically, the noise map generation unit 33A selects a plurality of measurement regions with densities different from each other, analyzes the standard deviation of luminance values and the average value of luminance values for the plurality of measurement regions, and obtains a characteristic graph of luminance—SNR (SN ratio) as the graph G28. In this case, the noise map generation unit 33A calculates the SNR for each measurement region on the basis of SNR=(average value of luminance values)+(standard deviation of luminance values). The noise map generation unit 33A then derives the relationship data G2 indicating the correspondence relation between each pixel position and pixel value from the optical image G1 acquired by the image acquisition unit 32A in the same way as in the first embodiment. Further, the noise map generation unit 33A derives the standard deviation of noise values corresponding to a pixel at each pixel position in the optical image by applying the correspondence relation indicated by the relational graph G27 to each pixel in the relationship data G2. As a result, the noise map generation unit 33A associates the derived standard deviation of noise with each pixel position, and derives relationship data G4 indicating the correspondence relation between each pixel position and the standard deviation of noise. The noise map generation unit 33A then generates the noise standard deviation map G5 on the basis of the derived relationship data G4.

In the optical image processing module 3A of the second embodiment, the image acquisition unit 32 acquires an optical image of the jig obtained by capturing an image of light from the jig (for example, light emitted from the jig, transmitted light from the jig, reflected light from the jig, or scattered light from the jig), and the noise map generation unit 33A derives relationship data from the optical image of the jig. According to the above configuration, since the relationship data is generated on the basis of the optical image obtained by actually capturing an image of the jig and the noise standard deviation map is generated, it is possible to realize noise removal corresponding to the relationship between the pixel value and the spread of noise. As a result, it is possible to more effectively remove noise in the optical image.

Meanwhile, the image acquisition unit 32A may acquire a plurality of optical images captured without the target object F, the noise map generation unit 33A may derive relationship data from the plurality of optical images, and the plurality of optical images may be a plurality of images with imaging conditions different from each other. According to the above configuration, since the relationship data is generated on the basis of the optical image obtained by actually performing image capturing and the noise standard deviation map is generated, it is possible to realize noise removal corresponding to the relationship between the pixel value and the spread of noise. As a result, it is possible to more effectively remove noise in the optical image.

Specifically, the image acquisition unit 32A may acquire a plurality of optical images captured without the target object F in step S301 described above, the noise map generation unit 33A may derives the relationship between the pixel value and the standard deviation of noise values from the optical image acquired by the image acquisition unit 32A in step S302 described above. The plurality of optical images are a plurality of images with imaging conditions different from each other. As an example, the image acquisition unit 32A acquires a plurality of optical images captured using the camera 2 without the target object F in advance of the observation processing of the target object F while the light intensity of the light source of observation light or the exposure time of the camera 2 is changed. The noise map generation unit 33A then derives the true pixel value for each optical image, and derives the standard deviation of noise on the basis of the true pixel value in the same way as in the second embodiment. Further, the noise map generation unit 33A plots the relationship between the true pixel value and the standard deviation of noise on a graph and draws an approximation curve in the same way as in the second embodiment, to thereby derive a relational graph indicating the relationship between the pixel value and the standard deviation of noise values. Finally, the noise map generation unit 33A generates a noise standard deviation map from the optical image acquired by the image acquisition unit 32A on the basis of the derived relational graph in the same way as in the second embodiment.

Modification Example

Although various embodiments of the present disclosure have been described above, the embodiments of the present disclosure are not limited to the above embodiments. For example, the building unit 35 may generate a training image by actually performing image capturing when each trained model 36 is built. That is, the training image may be an optical image actually generated using the camera 2 for multiple types of known structures.

Figure 14:
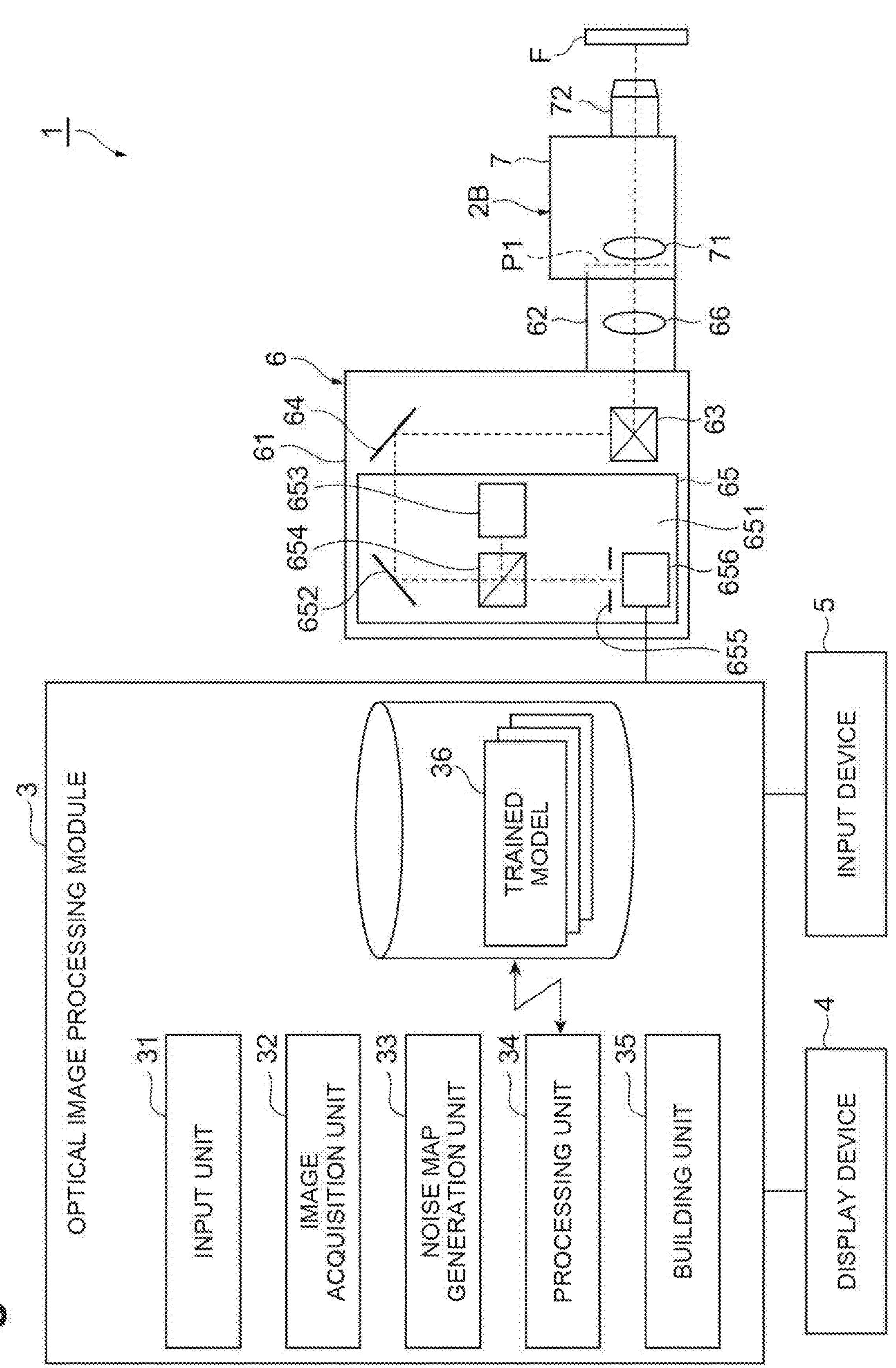
FIG. 14 is a block diagram illustrating a functional configuration of an optical image processing system according to a modification example.

The optical image processing system 1 may be a scanning type. The example shown in FIG. 14 is different from each of the above embodiments in that the optical image processing system 1 includes a confocal microscope 2B. The confocal microscope 2B acquires an image that enables the construction of an optical tomographic image of the target object F. The confocal microscope 2B is configured with a confocal microscope unit 6 connected to a connection port P1 for external unit connection of a microscope 7. This confocal microscope unit 6 is a device that irradiates the target object F disposed on the stage of the microscope 7 or the like with excitation light through a microscope optical system such as an imaging lens 71 or an objective lens 72 in the microscope 7 and receives (detects) fluorescence (light) which is light emitted from the target object F in accordance with its excitation light through the microscope optical system of the microscope 7 to generate and output an optical tomographic image.

Specifically, the confocal microscope unit 6 is configured to include a main housing 61, a lens barrel 62, a scanning mirror 63 fixed in the main housing 61, a fixed mirror 64, a subunit 65, and a scanning lens 66 fixed in the lens barrel 62. The lens barrel 62 constitutes a portion of the main housing 61 and is detachably connected to the connection port P1 of the microscope 7. Each component of the confocal microscope unit 6 will be described in detail below.

The scanning lens 66 in the lens barrel 62 is an optical element for relaying the reflection surface of the scanning mirror 63 to the pupil position of the objective lens 72 and simultaneously condensing excitation light (observation light) onto the primary imaging plane of the microscope optical system of the microscope 7. The scanning lens 66 guides the excitation light scanned by the scanning mirror 63 to the microscope optical system to irradiate the target object F, and accordingly guides fluorescence (observation light) generated from the target object F to the scanning mirror 63. Specifically, the scanning lens 66 is configured to form an image of the pupil of the objective lens 72 on the scanning mirror 63, and guides the fluorescence formed by the objective lens 72 and the imaging lens 71 of the microscope 7 to the scanning mirror 63.

The scanning mirror 63 in the main housing 61 is an optical scanning element such as, for example, a micro electro mechanical system (MEMS) mirror configured to tilt its reflective plate on two axes. The scanning mirror 63 has a role of scanning the target object F with the excitation light output from the subunit 65 by continuously changing its reflection angle, and guiding the fluorescence generated in accordance with the excitation light toward the subunit 65.

The fixed mirror 64 is a light-reflecting element fixed in the main housing 61, which reflects the excitation light output from the subunit 65 toward the scanning mirror 63 and reflects the fluorescence reflected by the scanning mirror 63 toward the subunit 65 coaxially with the excitation light.

The subunit 65 includes a base plate 651, a total reflection mirror 652 disposed on the base plate 651, a light source 653, a dichroic mirror 654, a pinhole plate 655, and a photodetector 656. The total reflection mirror 652 reflects the first excitation light of a wavelength $\lambda 1$ radiated by the subunit 65 and the first fluorescence of a wavelength range $\Delta\lambda 1$ generated from the target object F accordingly. The dichroic mirror 654 is a beam splitter provided in the reflection direction of the first fluorescence of the total reflection mirror 652, which has the property of transmitting the first fluorescence of a wavelength range $\Delta\lambda 1$ and reflecting the first excitation light of a wavelength $\lambda 1$ shorter than the wavelength range $\Delta\lambda 1$. The light source 653 is a light-emitting element (for example, a laser diode) that outputs the first excitation light (for example, laser beam) of a wavelength $\lambda 1$, and is disposed so that the first excitation light is reflected by the dichroic mirror 654 toward the total reflection mirror 652 coaxially with the first fluorescence. The pinhole plate 655 is an aperture member which is disposed so that its pinhole position coincides with the conjugate position of the spot of the first excitation light on the target object F to restrict the light flux of the first fluorescence, and constitutes a confocal optical system together with the light source 653 and the like. This pinhole plate 655 makes it possible to adjust the diameter of the pinhole from the outside and to change the resolution of an image detected by the photodetector 656 and the signal intensity of the image.

Figure 15:
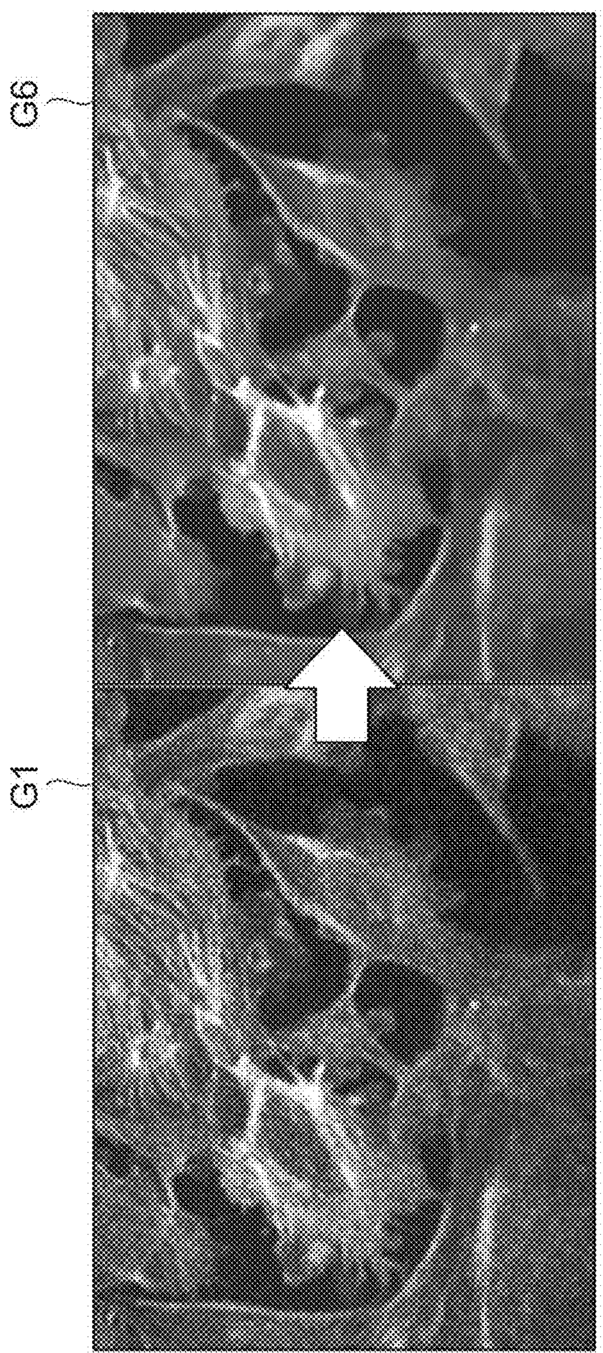
FIG. 15 is a diagram illustrating an example of optical images before and after noise removal processing according to the modification example.

The photodetector 656 is disposed with its detection surface facing the pinhole plate 655 and receives and detects the first fluorescence passing through the pinhole plate 655. Examples of the photodetector 656 include photodetectors (such as, for example, a CCD image sensor and a CMOS image sensor) similar to those in each of the above embodiments. The subunit 65 captures an image of light from the target object F using the photodetector 656 and outputs a digital signal based on the imaging result to the optical image processing module 3. The image acquisition unit 32 of the optical image processing module 3 acquires an optical image by generating image data on the basis of the digital signal received from the subunit 65. With the configuration of the present modification example, the trained model 36 is used in the same way as in each of the above embodiments, and thus it is possible to realize noise removal corresponding to the relationship between the pixel value and the spread of noise in the optical image acquired from the confocal microscope 2B, and to effectively remove noise in the optical image as a result. FIG. 15 shows the optical image G1 and the optical image G6 in a case where a PMT is used as the photodetector 21 and the target object F is irradiated with visible light as observation light. In this way, with the optical image processing module 3 of the present modification example, the optical image G6 from which noise in the optical image G1 is effectively removed can also be obtained by creating a noise map corresponding to the actually measured noise value.

Although the building unit 35 builds the trained model 36 in accordance with the type of photodetector 21 in the above embodiment, the trained model 36 may be a common trained model regardless of the type of photodetector 21. In a case where the common trained model 36 is built, for example, the building unit 35 may set the normal distribution model as the noise distribution model, in which case the condition information may not be acquired. In addition, for example, in a case where the amount of the light L is small, the building unit 35 may set the Poisson distribution model as the noise distribution model, in which case information indicating the amount of the light L may be acquired as the condition information.

The optical image processing method may further include an input step of accepting an input of condition information indicating imaging conditions when an image of the target object is captured, the noise map generation step may include deriving the evaluation value from the imaging conditions and the pixel value of each pixel in the optical image, and the condition information may include information indicating a type of photodetector used to capture an image of the target object. In addition, the optical image processing module may further include an input unit configured to accept an input of condition information indicating imaging conditions when an image of the target object is captured, the noise map generation unit may derive the evaluation value from the imaging conditions and the pixel value of each pixel in the optical image, and the condition information may include information indicating a type of photodetector used to capture an image of the target object. The relationship between the pixel value and noise in an optical image varies depending on the type of photodetector used to capture an image of the target object. According to the above configuration, the spread of the noise value in the pixel value of each pixel in the optical image is evaluated in consideration of the type of photodetector used to capture an image of the target object, and thus it is possible to realize noise removal corresponding to the relationship between the pixel value and the spread of noise in the optical image. As a result, it is possible to more effectively remove noise in the optical image.

The image acquisition step may include acquiring an optical image of a jig obtained by capturing an image of light from the jig, and the noise map generation step may include deriving the relationship data from the optical image of the jig. In addition, the image acquisition unit may acquire an optical image of a jig obtained by capturing an image of light from the jig, and the noise map generation unit may derive the relationship data from the optical image of the jig. According to the above configuration, since the relationship data is generated on the basis of the optical image obtained by actually capturing an image of the jig and the noise map is generated, it is possible to realize noise removal corresponding to the relationship between the pixel value and the spread of noise. As a result, it is possible to more effectively remove noise in the optical image.

The image acquisition step may include acquiring a plurality of optical images captured without the target object, the noise map generation step may include deriving the relationship data from the plurality of optical images, and the plurality of optical images may be a plurality of images with imaging conditions different from each other. In addition, the image acquisition unit may acquire a plurality of optical images captured without the target object, the noise map generation unit may derive the relationship data from the plurality of optical images, and the plurality of optical images may be a plurality of images with imaging conditions different from each other. According to the above configuration, since the relationship data is generated on the basis of the optical image obtained by actually performing image capturing and the noise map is generated, it is possible to realize noise removal corresponding to the relationship between the pixel value and the spread of noise. As a result, it is possible to more effectively remove noise in the optical image.

In the above embodiment, the evaluation value may be the standard deviation of noise values. Thereby, the spread of the noise value in the pixel value of each pixel in the optical image is evaluated more accurately, and thus it is possible to realize noise removal corresponding to the relationship between the pixel value and noise. As a result, it is possible to more effectively remove noise in the optical image.

The machine learning preprocessing method may further include an input step of accepting an input of condition information including photodetector information indicating a type of photodetector used to capture an image of a target object, and the training image generation step may include determining the noise distribution model to be used from the photodetector information. The relationship between the pixel value and noise in an optical image varies depending on the type of photodetector used to capture an image of the target object. According to the above configuration, it is possible to obtain a training image in which noise is appropriately added to the structure image in consideration of the type of photodetector used to capture an image of the target object.

In the machine learning preprocessing method, the noise distribution model may include at least one of a normal distribution model and a Poisson distribution model. Thereby, for example, in a case where the general photodetector which is not an electron multiplication type is used to capture an image of the target object, it is possible to obtain a training image in which noise is appropriately added to the structure image.

In the machine learning preprocessing method, the noise distribution model may include a Bessel function distribution model. Thereby, for example, in a case where the electron multiplication-type photodetector is used to capture an image of the target object, it is possible to obtain a training image in which noise is appropriately added to the structure image.

REFERENCE SIGNS LIST

- 1, 1A Optical image processing system
- 2 Camera (imaging device)
- 3, 3A Optical image processing module
- 21, 656 Photodetector
- 31 Input unit
- 32, 32A Image acquisition unit
- 33, 33A Noise map generation unit
- 34 Processing unit
- 35 building unit
- 36 Trained model
- F Target object
- G1 Optical image
- G3, G27 Relational graph (relationship data)

G5 Noise standard deviation map (noise map)
G6 Optical image
G26 Jig image (optical image of jig)
Gc Structure image
Gt Training image
L Light

The invention claimed is:

1. An optical image processing method comprising:

accepting an input of condition information indicating imaging conditions when an image of the target object is captured, wherein the condition information includes information indicating a type of photodetector used to capture an image of the target object;

acquiring an optical image obtained by capturing an image of light from a target object;

generating a noise map by:

deriving, for each pixel of the optical image, an evaluation value from the condition information and a pixel value of said each pixel on the basis of relationship data, wherein the relationship data indicates a predefined relationship between the pixel value and the evaluation value obtained by evaluating a spread of a noise value; and associating the derived evaluation value with said each pixel of the optical image to generate the noise map; and inputting the optical image and the noise map to a trained model built in advance through machine learning and executing image processing of removing noise from the optical image.

2. The optical image processing method according to claim 1, wherein acquiring of the optical image includes acquiring an optical image of a jig obtained by capturing an image of light from the jig, and deriving of the evaluation value includes deriving the relationship data from the optical image of the jig.

3. The optical image processing method according to claim 1, wherein acquiring of the optical image includes acquiring a plurality of optical images captured without the target object, deriving of the evaluation value includes deriving the relationship data from the plurality of optical images, and the plurality of optical images are a plurality of images with imaging conditions different from each other.

4. The optical image processing method according to claim 1, wherein the evaluation value is a standard deviation of noise values.

5. A machine learning method comprising:

using a structure image to which noise is added based on a predetermined noise distribution model as a training image and using the training image, a noise map generated from the training image on the basis of relationship data indicating a relationship between a pixel value and an evaluation value obtained by evaluating spread of a noise value, and noise-removed image data which is data obtained by removing noise from the training image, as training data, to build a trained model that outputs the noise-removed image data on the basis of the training image and the noise map through machine learning;

accepting an input of condition information indicating imaging conditions when an image of the target object is captured, wherein the condition information includes information indicating a type of photodetector used to capture an image of the target object;

acquiring an optical image obtained by capturing an image of light from a target object;

generating a noise map by:

deriving, for each pixel of the optical image, an evaluation value from the condition information and a pixel value of said each pixel on the basis of relationship data, wherein the relationship data indicates a predefined relationship between the pixel value and the evaluation value obtained by evaluating a spread of a noise value; and associating the derived evaluation value with said each pixel of the optical image to generate the noise map; and inputting the optical image and the noise map to the trained model built in advance through the machine learning and executing image processing of removing noise from the optical image.

6. A machine learning preprocessing method in the machine learning method according to claim 5, comprising:

generating the structure image to which noise is added based on the noise distribution model as the training image.

7. The machine learning preprocessing method according to claim 6, wherein generating of the structure image includes determining the noise distribution model from the photodetector information.

8. The machine learning preprocessing method according to claim 7, wherein the noise distribution model includes at least one of a normal distribution model and a Poisson distribution model.

9. The machine learning preprocessing method according to claim 7, wherein the noise distribution model includes a Bessel function distribution model.

10. An optical image processing module comprising a processor configured to:

accept an input of condition information indicating imaging conditions when an image of the target object is captured, wherein the condition information includes information indicating a type of photodetector used to capture an image of the target object;

acquire an optical image obtained by capturing an image of light from a target object;

generate a noise map by:

deriving, for each pixel of the optical image, an evaluation value from the condition information and a pixel value of said each pixel on the basis of relationship data, wherein the relationship data indicates a predefined relationship between the pixel value and the evaluation value obtained by evaluating a spread of a noise value; and associating the derived evaluation value with said each pixel of the optical image to generate the noise map; and input the optical image and the noise map to a trained model built in advance through machine learning and execute image processing of removing noise from the optical image.

11. The optical image processing module according to claim 10, wherein the processor acquires an optical image of a jig obtained by capturing an image of light from the jig, and derives the relationship data from the optical image of the jig.

12. The optical image processing module according to claim 10, wherein the processor acquires a plurality of optical images captured without the target object, derives the relationship data from the plurality of optical images, and wherein the plurality of optical images are a plurality of images with imaging conditions different from each other.

13. The optical image processing module according to claim 10, wherein the evaluation value is a standard deviation of noise values.

14. The optical image processing module according to claim 10, wherein the processor uses a structure image to which noise is added based on a predetermined noise distribution model as training image and use the training image, the noise map generated from the training image on the basis of the relationship data, and noise-removed image data which is data obtained by removing noise from the training image, as training data, to build a trained model that outputs the noise-removed image data on the basis of the training image and the noise map through machine learning.

15. A non-transitory computer-readable storage medium storing an optical image processing program causing a processor to execute a method comprising:

accepting an input of condition information indicating imaging conditions when an image of the target object is captured, wherein the condition information includes information indicating a type of photodetector used to capture an image of the target object;

acquiring an optical image obtained by capturing an image of light from a target object;

generating a noise map by:

deriving, for each pixel of the optical image, an evaluation value from the condition information and a pixel value of said each pixel on the basis of relationship data, wherein the relationship data indicates a predefined relationship between the pixel value and the evaluation value obtained by evaluating a spread of a noise value; and associating the derived evaluation value with said each pixel of the optical image to generate the noise map; and inputting the optical image and the noise map to a trained model built in advance through machine learning and executing image processing of removing noise from the optical image.

16. An optical image processing system comprising:

the optical image processing module according to claim 10; and an imaging device configured to acquire the optical image by capturing an image of light from the target object.

* * * * *